United States Patent
Ding et al.

(10) Patent No.: US 11,250,626 B1
(45) Date of Patent: Feb. 15, 2022

(54) VIRTUAL STAGE BASED ON PARALLEL SIMULATION

(71) Applicant: BEIJING INSTITUTE OF TECHNOLOGY, Beijing (CN)

(72) Inventors: Gangyi Ding, Beijing (CN); Tianyu Huang, Beijing (CN); Lijie Li, Beijing (CN); Peng Li, Beijing (CN); Mingxiang Tang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/397,748

(22) Filed: Aug. 9, 2021

(30) Foreign Application Priority Data

Aug. 13, 2020 (CN) .......................... 202010810207.0
Aug. 21, 2020 (CN) .......................... 202010846535.6
Aug. 24, 2020 (CN) .......................... 202010854865.X

(51) Int. Cl.
*G06T 17/10* (2006.01)
*A63J 1/00* (2006.01)
(Continued)

(52) U.S. Cl.
CPC ................. *G06T 17/10* (2013.01); *A63J 1/00* (2013.01); *G06T 7/11* (2017.01); *G06T 7/194* (2017.01);
(Continued)

(58) Field of Classification Search
None
See application file for complete search history.

(56) References Cited

U.S. PATENT DOCUMENTS 9,729,796 B1 * 8/2017 Chen .................... H04N 5/2353
10,419,716 B1 * 9/2019 Tanumihardja ...... G09B 19/003
(Continued)

FOREIGN PATENT DOCUMENTS

| CN | 103281480 A | 9/2013 |
|---|---|---|
| CN | 203554552 U | 4/2014 |
| CN | 109993829 A | 7/2019 |

OTHER PUBLICATIONS

R. Yuan, Z. Zhang, P. Song, J. Zhang and L. Qin, "Construction of Virtual Video Scene and Its Visualization During Sports Training," in IEEE Access, vol. 8, pp. 124999-125012, 2020, doi: 10.1109/ACCESS.2020.3007897. (Year: 2020).*

(Continued)

*Primary Examiner* — James A Thompson
(74) *Attorney, Agent, or Firm* — Calfee Halter & Griswold LLP

(57) ABSTRACT

A virtual stage based on parallel simulation, includes a stage modeling unit, a motion simulation unit, a display simulation unit, and a data extraction output unit. The stage modeling unit performs stage simulation modeling according to the designed stage styling; the motion simulation unit simulates a stage motion in a simulation system according to the designed stage animation; the display simulation unit is configured to simulate LED screen display of the stage in the simulation system according to the designed stage background. The data extraction output unit includes a styling extraction output unit, a motion extraction output unit and a display extraction output unit, which are configured to extract data from the stage modeling unit, the motion simulation unit, and the display simulation unit respectively for processing and conversion, and output geometric styling parameters of an actual stage, stage mechanical motion parameters, and stage LED screen display parameters.

15 Claims, 8 Drawing Sheets

(51) Int. Cl.
    *G06T 7/194*     (2017.01)
    *G06T 7/20*     (2017.01)
    *G09G 5/00*     (2006.01)
    *G06T 7/11*     (2017.01)

(52) U.S. Cl.
    CPC ............... *G06T 7/20* (2013.01); *G09G 5/006* (2013.01); *G09G 2320/10* (2013.01)

(56) References Cited

U.S. PATENT DOCUMENTS

| | | | |
|---|---|---|---|
| 10,854,007 B2* | 12/2020 | Gawrys | G06F 30/12 |
| 2009/0144137 A1* | 6/2009 | Moulton | G06Q 30/0601 705/14.73 |
| 2017/0243352 A1* | 8/2017 | Kutliroff | G06T 19/006 |
| 2018/0144458 A1* | 5/2018 | Xu | G06T 7/70 |
| 2019/0362529 A1* | 11/2019 | Wedig | G06T 17/20 |
| 2020/0372676 A1* | 11/2020 | Tzur | G06T 7/75 |

OTHER PUBLICATIONS

X. Min, W. Zhang, S. Sun, N. Zhao, S. Tang and Y. Zhuang, "VPModel: High-Fidelity Product Simulation in a Virtual-Physical Environment," in IEEE Transactions on Visualization and Computer Graphics, vol. 25, No. 11, pp. 3083-3093, Nov. 2019, doi: 10.1109/TVCG.2019.2932276. (Year: 2019).*

* cited by examiner

VIRTUAL STAGE BASED ON PARALLEL SIMULATION

RELATED APPLICATION

The present application claims the benefit of Chinese patent application No. 202010846535.6 filed on Aug. 21, 2020, the entire content of which is incorporated herein by reference.

The present application claims the benefit of Chinese patent application No. 202010854865.X filed on Aug. 24, 2020, the entire content of which is incorporated herein by reference.

The present application claims the benefit of Chinese patent application No. 202010810207.0 filed on Aug. 13, 2020, the entire content of which is incorporated herein by reference.

TECHNICAL FIELD

The present disclosure relates to a simulation stage, and in particular to a virtual stage with dynamic effect based on parallel simulation, which relates to the technical field of computer simulation.

BACKGROUND

A stage provides space for performances. Whether a cultural performance can achieve the desired effect, the stage is the foundation. The modern stage, especially the multi-media dynamic stage, creates more development space for the stage art in the limited stage, and provides more changes and choices for the director and stage art personnel. The development of the lifting platform is a representative of the development of stage machinery, and the lifting platform is generally used in modern stage technology. From the initial small number of lifting platforms to the current large-scale use of lifting platforms, the lifting platform has become an important part of the stage from an auxiliary mechanical equipment of the stage.

SUMMARY

An object of the present disclosure is to provide a virtual stage based on parallel simulation in view of the shortcomings of the related art, to design, control and manage the stage by establishing a "digital twin" for the physical stage, to enrich the realization methods of stage creativity, and to improve efficiency and save costs.

To achieve the above objects, the present disclosure provides a virtual stage based on parallel simulation, comprising a stage modeling unit, a motion simulation unit, a display simulation unit, a data extraction output unit, and a display monitoring unit, wherein the stage modeling unit is configured to perform stage simulation modeling;

the motion simulation unit is configured to simulate a stage motion in a simulation system;

the display simulation unit is configured to simulate LED screen display of the stage in the simulation system;

the data extraction output unit comprising a styling extraction output unit, a motion extraction output unit and a display extraction output unit, is configured to extract data from the virtual stage for processing and conversion, and output geometric styling parameters of an actual stage, stage mechanical motion parameters, and stage LED screen display parameters;

the display monitoring unit is configured to set up a capture card on the actual stage, collect LED video images and return them to the virtual stage for analysis and comparison;

wherein, the display extraction output unit comprises a module that maps a stage image background to display data of each display screen in the stage, and a specific mapping method comprises the following steps:

S1, obtaining a spatial position, orientation and size of each display screen;

S2, determining a display source image corresponding to each display screen, expanding the display screen on a plane of the display source image, and obtaining a corresponding segmentation area of each display screen in the source image according to a corresponding relationship between an expanded geometric shape of the display screen and the source image set by a user;

S3, performing the following operations in cycles for each display screen:

S31, segmenting the corresponding segmentation area of the display screen from the source image;

S32, outputting a content of the corresponding segmentation area to a display controller of the display screen;

S33, outputting an image content of the display controller to the display screen;

wherein the display extraction output unit further comprises a module that maps a stage video background to the display data of each display screen in the stage, and a specific mapping method is: decomposing a video into a sequence of frame images, obtaining a corresponding source image at each display time point and performing the steps S1-S3:

S1, obtaining a spatial position, orientation and size of each display screen;

S2, determining a display source image corresponding to each display screen, expanding the display screen on a plane of the display source image, and obtaining a corresponding segmentation area of each display screen in the source image according to a corresponding relationship between an expanded geometric shape of the display screen and the source image set by a user;

S3, performing the following operations in cycles for each display screen:

S31, segmenting the corresponding segmentation area of the display screen from the source image;

S32, adding a content of the corresponding segmentation area to a stage screen control video file corresponding to the display screen;

S4. when to display, the display controller reading the stage screen control video file containing all time points and outputting it to the display screen.

In some embodiments, before the step S3, the source image is read into a source memory; in the step S3, a method of segmenting the corresponding segmentation area of the display screen from the source image is as follows: allocating target memory space for the display screen, obtaining source memory address space corresponding to the segmentation area according to an offset of each pixel in the corresponding segmentation area of the display screen in the source image relative to an image origin, and copying a content of the address space to the target memory in an order of pixels of the display screen.

In some embodiments, the virtual stage based on parallel simulation further comprising a step of performing image editing on the segmentation area.

In some embodiments, all the display screens are grouped according to their positions, and the display controllers of each group of display screens are combined; in the step S3, allocates the target memory space for each group of display screens, copy the corresponding segmentation area of each display screen in the group to the target memory space in an arrangement order of the display screens, and finally output a stored content in the target memory space to the display controller of the group of display screens.

In some embodiments, for a multi-layered stage with occlusion relationship, an occluded group of display screens does not perform a target memory copy operation; in a process of outputting the target memory to the display controller, directly reuse the content of the target memory of the unoccluded group of display screens with positions at the forefront.

In some embodiments, an output sequence of the groups of display screens is arranged so that the multi-layered stage with occlusion relationship is output in an order from front to back, and a shared target memory space for a corresponding group of display screens is allocated; in the step S3, firstly determine whether the group of display screens is occluded, and directly reuse an existing content of the shared target memory space for the occluded group of display screens.

In some embodiments, the virtual stage based on parallel simulation further comprising a motion monitoring unit configured to measure motion state data of the actual stage and perform analysis and comparison.

In some embodiments, the virtual stage based on parallel simulation further comprises a stage configuration file and a universal stage module unit, wherein:

the stage configuration file is configured to write specific stage related parameters;

the universal stage module unit is configured to establish a universal stage module in the simulation system and encapsulate 3D drawing function of the universal stage module;

the stage modeling unit is configured to model stage styling by using the universal stage module according to the stage configuration file;

the motion simulation unit is configured to simulate a motion of the universal stage module in the simulation system according to the stage configuration file;

the display simulation unit is configured to simulate LED screen display of the universal stage module in the simulation system according to the stage configuration file;

the data extraction output unit comprising a styling extraction output unit, a motion extraction output unit and a display extraction output unit, is configured to extract data of each universal stage module from the simulation system for processing and conversion, and output geometric styling parameters of each actual stage module, stage mechanical motion parameters, and stage LED screen display parameters;

the stage configuration file comprises a list of stage modules comprised in a specific stage, parameters of each stage module in the list comprising a size specification, a motion direction, a speed limit, and screen resolutions of six surfaces of up, down, left, right, front and rear; the stage configuration file further comprises background configuration parameters; the background configuration parameters comprising, for an image background, a path and resolution of a source image file, a corresponding source image file for each display screen, and a corresponding relationship between each source image and a stage space; and, for a video background, a path and resolution of a source video file and a stage screen control video file, a source video file and a stage screen control video file corresponding for each display screen, and a corresponding relationship between each source video and the stage space.

In some embodiments, the universal stage module unit is implemented in a componentized manner, and each universal stage module is initialized as a software component, and 3D rendering data of the module is encapsulated inside the component, which is responsible for realization of 3D scene drawing of this module, and the virtual stage realizes management of the stage modules by loading and unloading components and switching between components and informs a selected stage module to realize 3D scene drawing through message distribution.

In some embodiments, the stage configuration file further comprises an operation sequence of loading, unloading, and switching of stage modules, and the stage modeling unit performs automated stage modeling according to the operation sequence.

According to another aspect, there is provided a method for editing and displaying dynamic stage video of a large-scale performance based on time-space consistency, it comprising the following steps:

I. designing one or more source videos as a background of the stage and decomposing each source video file into a sequence of video frames, according to an overall display effect of the stage; allocating source memory for frame images and allocating target memory for a display screen;

II. setting a display time interval of the display screen and performing the following operations for each display time point:

S1. reading all frame images at this time point into the source memory;

S2. obtaining a dynamic stage styling corresponding to the time point, and obtaining a spatial position, orientation and size of each display screen in each stage module;

S3. determining a display source image corresponding to the display screen of the stage module, expanding the display screen on a plane of the source image, and obtaining a corresponding segmentation area of each display screen in the source image according to a corresponding relationship between an expanded geometric shape of the display screen and the source image set by a user;

S4. performing the following operations in cycles for all display screens:

S41: segmenting the corresponding segmentation area of the display screen from the corresponding source image;

S42. outputting a content of the corresponding segmentation area to a target memory of the display screen;

S43. adding a content of the target memory to a stage screen control video file;

III. When to display, outputting the stage screen control video file containing all time points to a display controller;

grouping all the display screens according to their positions, and combing the display controllers of each group of display screens; in the step I, allocating target memory space for each group of display screens, in step S4, cyclically executing image segmentation and memory copy operations in units of display screen groupings, copying the corresponding segmentation area of each display screen in the group to the target memory space in an arrangement order of the display screens;

for a multi-layered stage with occlusion relationship, an occluded group of display screens doing not perform a target memory copy operation; in a process of outputting the target memory to the display controller, directly reusing the content of the target memory of the unoccluded group of display screens with positions at the forefront; and arranging an output sequence of the groups of display screens so that the multi-layered stage with occlusion relationship is output in an order from front to back, and allocating a shared target memory space for a corresponding group of display screens; in the step S4, firstly determining whether the group of display screens is occluded, and directly reusing an existing content of the shared target memory space for the occluded group of display screens.

In some embodiments, the method further comprises a step of performing image editing on the segmentation area.

According to another aspect, there is provided an electronic device, the electronic device comprising:

at least one processor; and, a memory communicatively connected to the at least one processor; wherein the memory stores instructions executable by the at least one processor, and the instructions are executed by the at least one processor to enable the at least one processor to execute the method described above.

According to another aspect, there is provided a non-transitory computer-readable storage medium, the non-transitory computer-readable storage medium storing computer instructions, and the computer instructions being configured to enable a computer execute the method described above.

Beneficial Effects

The present disclosure provides a virtual stage based on parallel simulation, which designs, controls and manages the stage by establishing a "digital twin" for the physical stage, enriches the realization methods of stage creativity, and improves efficiency and saves costs.

DETAILED DESCRIPTION OF EMBODIMENTS

Figure 1:
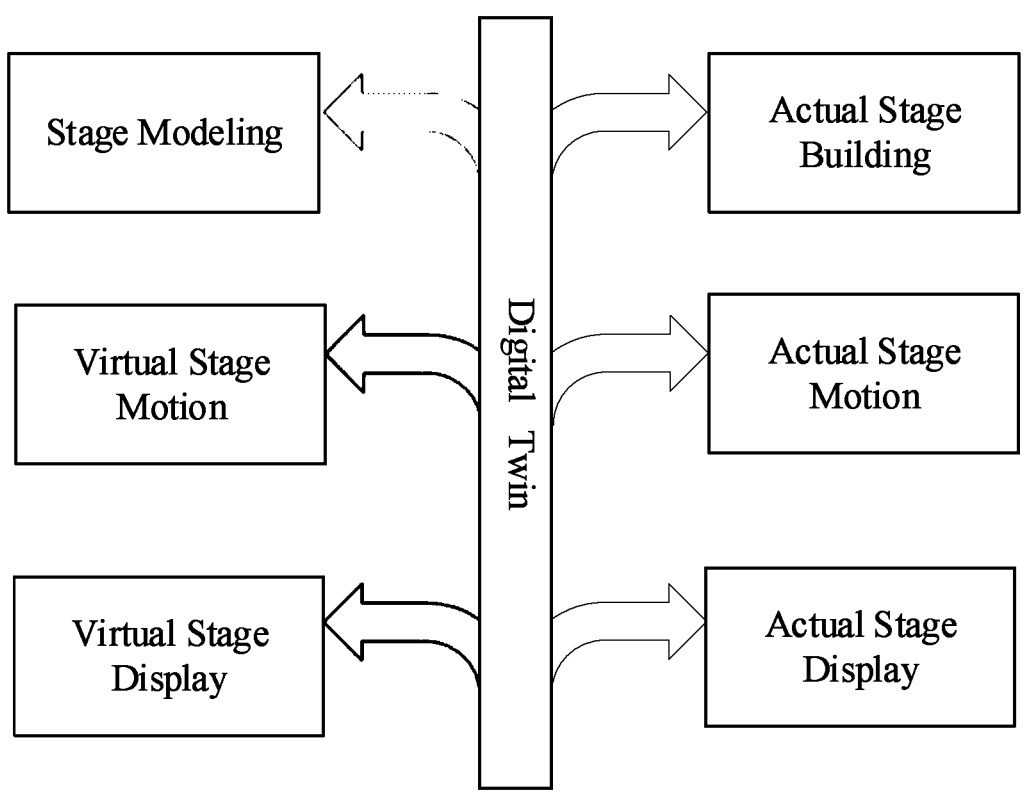
FIG. 1 is a schematic diagram of the principle of a virtual stage based on parallel simulation.

Hereinafter, preferred embodiments of the present disclosure will be described in detail with reference to the accompanying drawings.

Embodiment 1

With the increase in the number of lifting platforms, the structure and use of lifting platforms have also changed. Especially in the three-dimensional dynamic multimedia stage, LED panels that can play video are installed on the top surface and around the lifting platforms. When the lifting platform rises and falls and forms a static stage shape, each video playing surface displays pictures or videos that match the program, and the lifting platform therefore becomes a part of the stage background. In large-scale performances, the number of LED display screens installed on the lifting platform is huge, and the lifting platform often contains thousands of display screens of various sizes. The large stage, complex stage motion machinery and thousands of display screens of various sizes have turned the large stage of modern performance into a complex entity system. How to design, manufacture, use, and maintain the stage has also become a complex subject. Beijing Institute of Technology's Wang Kaixuan's 2015 master's thesis "Research on intelligent stage technology based on data driving", and an authorized patent No. ZL201910276205.5 "a modular virtual stage", both proposed some solutions to the simulation control of the stage, but these solutions only involve part of the use process such as stage modeling or data control, instead of solutions for the whole process of stage design, manufacturing and use. Especially, for displaying of the massive LED display screens on the stage, these technical solutions were silent.

Parallel simulation is to make full use of physical model, sensor update, operation history and other data, integrate multi-disciplinary, multi-physical quantity, multi-scale, multi-probability simulation process, and complete the mapping in the virtual space, thereby reflecting the full-life cycle process of the corresponding physical equipment. Simply put, parallel simulation is to create a digital version of "clone" on the basis of a device or system. This "clone" is also known as the "digital twin". It is created on the information platform and is virtual. The real-time state, as well as the external environmental conditions, of the ontology will reappear on the "twin". If system design changes are needed to be made or how the system reacts under special external conditions is needed to be known, engineers can perform "experiments" on the twin. In this way, the impact on the ontology is avoided, efficiency can be improved, and costs can be saved.

Parallel simulation has been valued and applied in many fields of industrial manufacturing, but there are no relevant reports in the field of culture and art and stage use. If one can use the concepts and technologies of the parallel simulation field to design, use and manage the stage by establishing a "digital twin" for the stage, it will bring revolutionary changes to the design, real-time control, and full monitoring process of the stage. The realization method of stage creativity is enriched, the efficiency is greatly improved and the costs are saved. In view of the shortcomings of the related art, the present disclosure provides a virtual stage based on parallel simulation, which designs, controls and manages the stage by establishing a "digital twin" for the physical stage. The stage to which the present disclosure is applicable can be a three-dimensional dynamic multimedia stage used for large-scale performances. The stage comprises mechanically controlled lifting platforms, and the surfaces of the lifting platforms are equipped with LED panels that can play videos. When the lifting platform rises and falls and forms a static stage shape, each video playing surface displays pictures or videos that match the program, and the lifting platform therefore becomes a part of the stage background.

The parallel simulation concept realized by the present disclosure is shown as FIG. 1. By completing the mapping in the virtual space, a digital version of the "clone" is constructed for the physical stage on the information platform. Digital simulation has been used in the auxiliary design of the stage, and the main difference between the virtual stage based on parallel simulation and the ordinary digital simulation is: the virtual stage based on parallel simulation is a dynamic clone of the whole process, and it plays roles of assisting creativity, program verification, real-time process control, and execution process monitoring during all of the geometric modeling design, mechanical motion simulation and control, and background display process of LED screens of the physical stage.

Figure 2:
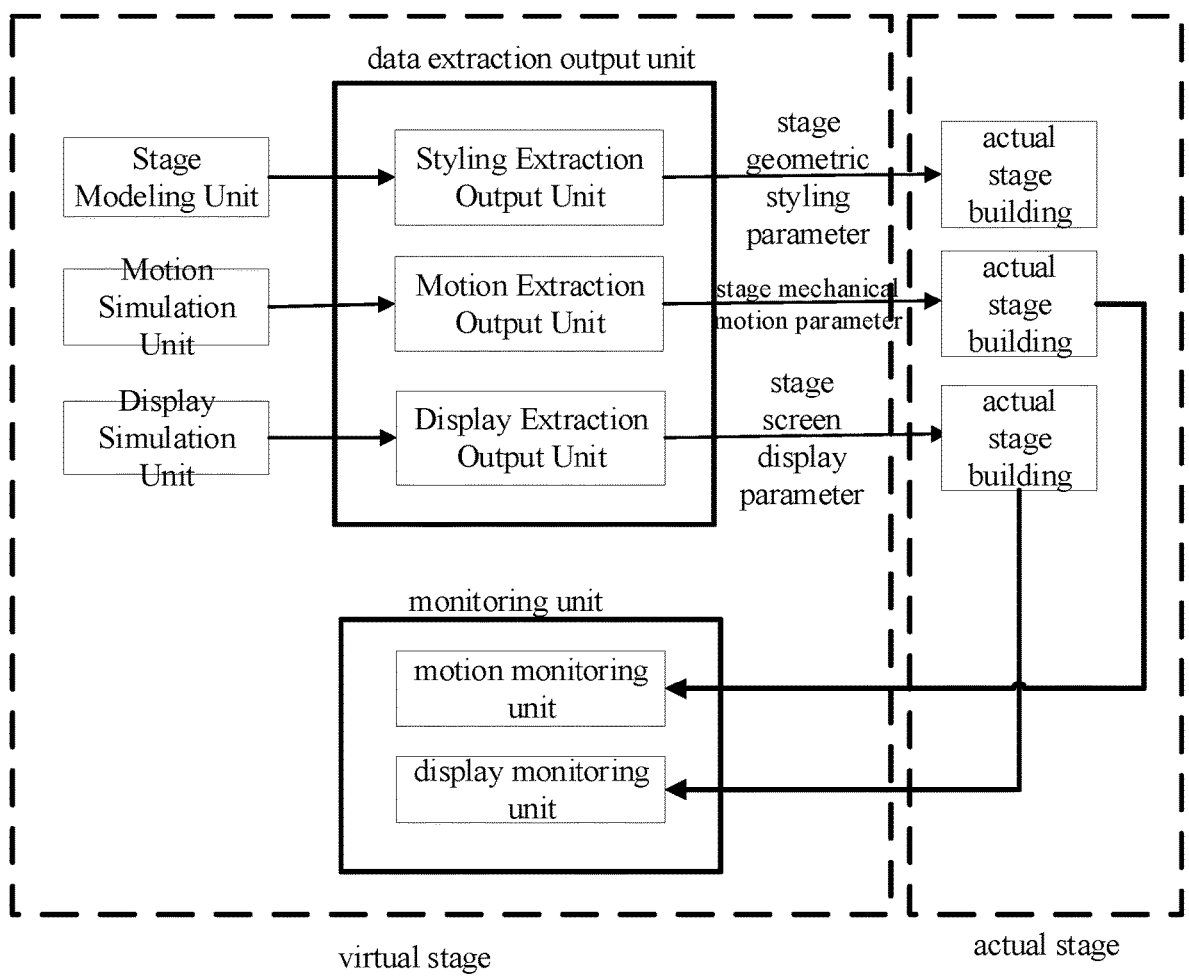
FIG. 2 is a block diagram of the virtual stage based on parallel simulation.

Embodiment 1 of the present disclosure provides a virtual stage based on parallel simulation, as shown in FIG. 2, comprising a stage modeling unit, a motion simulation unit, a display simulation unit, and a data extraction output unit.

The stage modeling unit is configured to perform stage simulation modeling. The stage modeling unit uses 3D modeling software such as Unity, Unreal Engine, SolidWorks, etc. to establish a virtual model of each stage lifting platform, and further establish a virtual model of the entire stage. The parameters of the virtual model of the stage correspond exactly to the actual stage.

The motion simulation unit is configured to simulate a stage motion in a simulation system. The motion simulation unit drives the motion of the virtual model of the stage by inputting the motion parameters of each stage lifting platform (such as the position and shape parameters of each stage lifting platform at various time points) in the simulation engine software such as Unity and Unreal Engine.

The display simulation unit is configured to simulate LED screen display of the stage in the simulation system. Since the surface of the actual stage lifting platform is affixed with a display screen, the display simulation unit uses the texture pattern to simulate the LED screen display of the actual stage by covering the surface of the virtual model of the stage with a texture.

The data extraction output unit comprising a styling extraction output unit, a motion extraction output unit and a display extraction output unit, is configured to extract data from the virtual stage for processing and conversion, and output geometric styling parameters of an actual stage, stage mechanical motion parameters, and stage LED screen display parameters. The data extraction output unit obtains and outputs various parameters of the virtual stage model from the simulation engine software, so that these parameters can be used to design, control, and monitor and compare the actual stage.

According to the solution proposed in Embodiment 1, the virtual stage based on parallel simulation can play a role in assisting stage design in a geometric styling design phase of a physical stage. Designers directly perform geometric styling design of the virtual stage through the stage modeling unit in the digital simulation system, or perform simulation modeling through the stage modeling unit according to the stage geometric styling designed by other auxiliary design software. For example, the CAD system can be used to design the stage geometric styling, and then the point/line/surface structure data of the styling can be used. After the modeling is completed, the geometric styling parameters of the stage are extracted from the simulation system through the styling extraction output unit, and the actual stage building is performed according to the geometric styling parameters.

During the dynamic operation of the stage, designers directly design stage motion parameters in the motion simulation unit to view the stage motion effects; or use the motion simulation unit to simulate the stage motion animation designed by other tools. After obtaining satisfactory results in the simulation system, the mechanical motion parameters of the stage, such as the initial position, speed, acceleration, etc., of the lifting platform are extracted from the simulation system through the motion extraction output unit, and the operation of the actual stage machinery is controlled according to the extracted mechanical motion parameters.

In the process of background display of the stage LED screen, designers design the stage image or video background in the display simulation unit, or use the display simulation unit to display and simulate the stage image or video background designed by other tools. After obtaining satisfactory results, the stage LED screen display parameters are extracted from the simulation system through the display extraction output unit, and the LED screen display of the actual stage is controlled.

According to a specific implementation of an embodiment of the present disclosure, the display extraction output unit comprises a module that maps the stage image background to the display data of each display screen in the stage, and the specific mapping method comprises the following steps:

S1, obtaining a spatial position, orientation and size of each display screen;

S2, determining a display source image corresponding to each display screen, expanding the display screen on a plane of the display source image, and obtaining a corresponding segmentation area of each display screen in the source image according to a corresponding relationship between an expanded geometric shape of the display screen and the source image set by a user;

S3, performing the following operations in cycles for each display screen:

S31, segmenting the corresponding segmentation area of the display screen from the source image;

S32, outputting a content of the corresponding segmentation area to a display controller of the display screen;

S33, outputting an image content of the display controller to the display screen.

Figure 3:
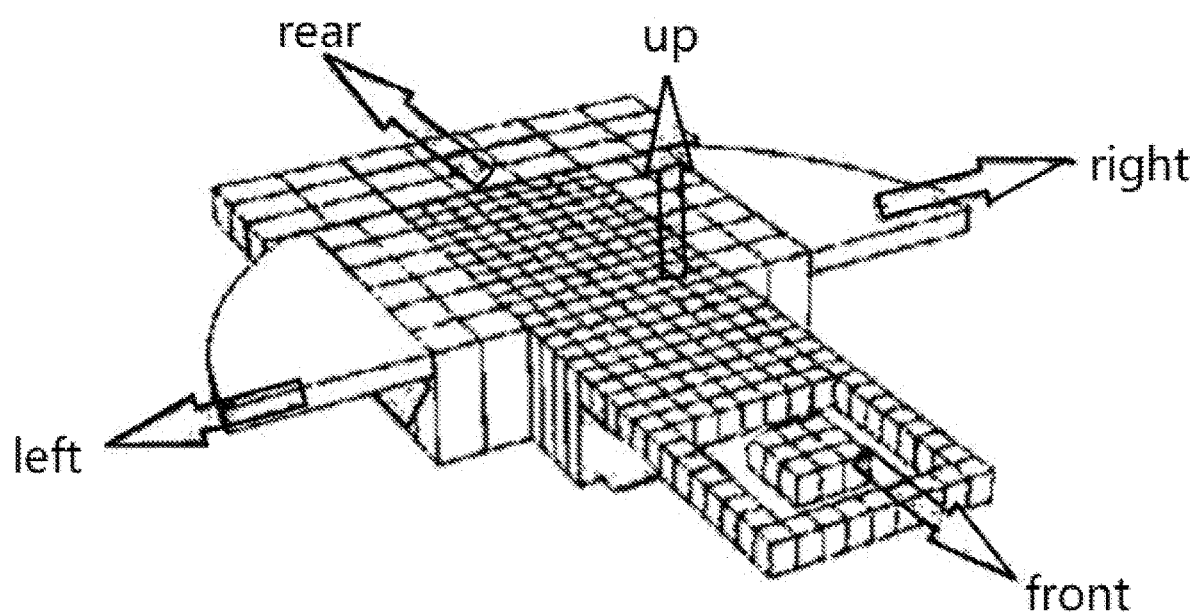
FIG. 3 is a schematic diagram of a dynamic stage.
Figure 4:
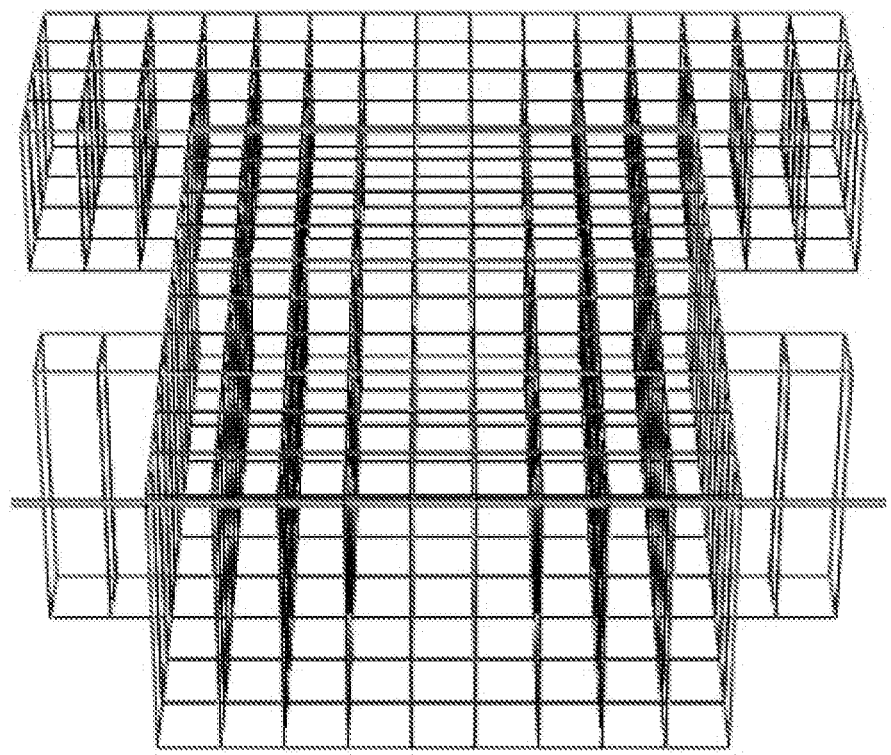
FIG. 4 is a second schematic diagram of a dynamic stage.
Figure 5:
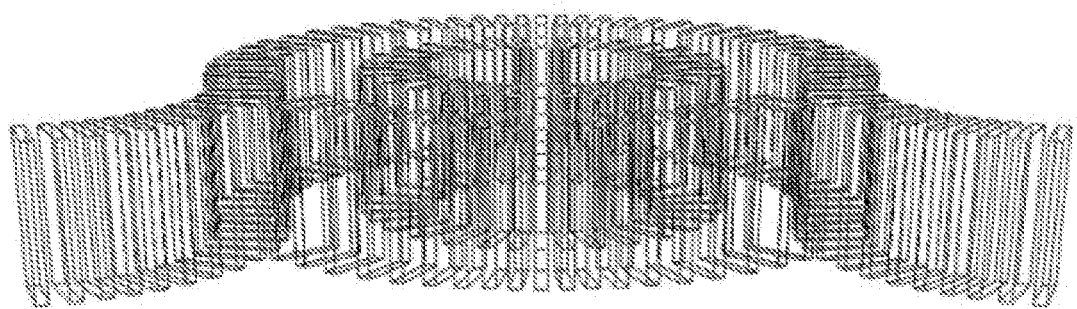
FIG. 5 is a third schematic diagram of a dynamic stage.

FIG. 3, FIG. 4 and FIG. 5 show three dynamic stages respectively. As shown in FIG. 3, FIG. 4, and FIG. 5, the large-scale performance dynamic stage is composed of multiple lifting platforms. The lifting platforms may be cubes, cuboids, or other special shapes. Each lifting platform of the stage is connected with a sliding rail, and the lifting platform is controlled to move forward and backward, left and right, or up and down through the mechanical sliding rail. By controlling the movement of the lifting platform, different stage stylings can be formed. In the stage shown in FIG. 4, the top and sides of each lifting platform are equipped with LED display screens that can play video. Similar to controlling the display output by a graphics card, in order to control the display of the LED display screens, each LED display screen has a signal line connected with the display controller. The broadcaster controls the display content of each LED display screen by outputting the display signal to the display controller.

Since the dynamic stage contains multiple lifting platforms, the contents output by the LED screens on the surface of each lifting platform cooperate to form the overall background of the stage. In large-scale performances, the number of LED display screens installed on the lifting platform is huge, often containing thousands of display screens of various sizes. If the display content is designed separately for each display screen, it will undoubtedly consume huge manpower and material resources, and increase the design difficulty of the stage designer, and it is difficult to guarantee the final composite effect of all the display screens.

According to this embodiment, the display extraction output unit comprises a module that maps the stage image background to the display data of each display screen in the stage. The stage designer does not need to design the display content for each display screen separately, but regards the stage styling formed by all lifting platforms as a whole, and the background is designed according to the overall display effect of the stage. For example, if all the lifting platforms constitute a large flat screen, the designer only needs to design the background displayed on this large screen. Different positions of the complex stage may display different images, such as the sky image on the top 3D stage, the forest image on the ground 3D stage, etc. Designers need to create multiple source images for the stage background. The stage shown in FIG. 4 is all made up of a cube lifting platforms, that is, the display screens installed on the top and sides of the lifting platform may have five orientations: top, left, right, front, and back. The display contents of the display screens with same orientations will be combined to form the stage background in that orientation. Audiences at different positions of the stage see different display screens, that is, different stage backgrounds. Therefore, designers need to design different source images for each orientation, that is, design five source images for the stage shown in FIG. 4. For complex stage stylings, for example, a plurality of partial 3D dynamic stage stylings shown in FIG. 4 are arranged in the overall stage, five source images need to be designed for each partial 3D stage.

For stage designers, there is no need to care about how the display screens of the lifting platforms are designed and installed, but only needs to know the stage styling at a specific moment and design the source images as the overall background of the stage.

The display extraction output unit comprises a module that maps the stage image background to the display data of each display screen in the stage. The specific mapping method comprises the following steps:

S1. Obtain the spatial position, orientation and size of each display screen.

After the stage designer designs the source images as the overall background of the stage, the stage technician needs to accurately map the source images to each LED display screen. In order to perform accurate mapping, a specific stage styling needs to be obtained firstly. Since each screen in the dynamic stage moves with time, the first need is to obtain the position and shape and size data of the lifting platform through the virtual stage based on parallel simulation, and the position, orientation and size data of each screen at the specific moment of the mapping are further obtained.

S2. Determine a display source image corresponding to each display screen, expand the display screen on a plane of the display source image, and obtain a corresponding segmentation area of each display screen in the source image according to a corresponding relationship between an expanded geometric shape of the display screen and the source image set by a user.

In order to establish the corresponding relationship between the source image and the stage display screen, after obtaining the spatial position and size of each display screen, the display screen needs to be expanded on the corresponding plane of the source image. It should be noted that even if there are multiple display screens installed on the same surface of the lifting platform, since each display screen has a different orientation, the corresponding source images are also different. In the dynamic stage as shown in FIG. 4, the 5 display screens on the surface of each lifting platform correspond to 5 source images, respectively. Therefore, before expanding, it requires to determine the source image to be displayed corresponding to each display screen. This corresponding relationship can be automatically determined by a program. For example, in a dynamic stage as shown in FIG. 4, the corresponding source image to be displayed can be determined by the orientation of each display screen. In some dynamic stages, the user needs to specify the corresponding source image to be displayed. For example, FIG. 5 shows a lifting platform arranged in a cylindrical shape. There are multiple cylinders included in the overall stage, and each cylinder is composed of the lifting platform arrangement as shown in FIG. 5. The user can specify each cylinder to display one specific image.

After the source image to be displayed corresponding to each display screen is established, the display screen needs to be expanded on the plane of the source image to be displayed. The specific expanding strategy is set by the user according to the stage characteristics and stage design. For example, for the dynamic stage shown in FIG. 4, it can be expanded by projection, that is, each display screen is projected on the plane of the source image to be displayed. For the cylindrical stage shown in FIG. 5, all the display screens parallel to the cylindrical surface can be tiled and expanded, and the adjacent display screens are seamlessly connected. After expanding, a rectangle is obtained, and then the source images designed by the stage designer and needed to be displayed on the cylindrical surface is mapped on this rectangle.

After the display screen is expanded on the plane of the source image to be displayed, it is also needed to set the corresponding relationship between the expanded geometric shape of the display screen and the source image. For example, in the dynamic stage as shown in FIG. 4, after all the display screens are projected on the corresponding plane of the source image, the expanded geometric shape obtained may not be a rectangle. The user can set the largest rectangle that can be formed by the projection of the display screen to correspond to the source image according to the motion range of the display screen. Alternatively, the user can obtain a minimum rectangle that contains all the projections of the display screen at each specific moment during the movement of the display screen, and set the rectangle to correspond to the source image. Since the geometric shape after expanding is not a complete rectangle, the designer needs to take into account during the design process that the movement of the lifting platform may cause part of the content of the source image to be missing. In the dynamic stage shown in FIG. 5, the rectangle obtained by tiling and expanding all the display screens parallel to the cylindrical surface corresponds to the source image that needs to be displayed on the cylindrical surface, and an effect that the designed source image is wrapped on the cylindrical surface can be obtained.

S3. Perform the following operations in cycles for each display screen:

S31, segment the corresponding segmentation area of the display screen from the source image;

S32, output a content of the corresponding segmentation area to a display controller of the display screen;

S33, output an image content of the display controller to the display screen.

After obtaining the corresponding segmentation area of each display screen in the source image in step S2, the step S3 needs to segment the to-be-displayed content of each display screen from the source image and transmit it to the display screen for output. Similar to the graphics card controlling the display output, each LED display screen of the dynamic stage also needs to be connected to the display controller through a signal line. The stage technicians output the content to be displayed on each display screen to the display controller, and the display screen obtains and outputs the content to be output, from the display controller through the signal line.

Under ideal conditions, at each display time point, the source image is converted and output to the display screen in real time, so that the dynamic video background can be seen on the display screen of the dynamic stage. However, in actual situations, because the dynamic stage of a large-scale performance involves hundreds of high-resolution display screens, the video files are huge, and it takes a long time to convert, copy, and output each frame of source image. Therefore, if the video frame image is converted and output at each specific moment of display, the frame rate required for video output cannot be reached, that is, the effect of real-time video background display cannot be achieved.

According to a specific implementation of an embodiment of the present disclosure, the display extraction output unit comprises a module that maps the stage video background to the display data of each display screen in the stage. The specific mapping method is: decomposing a video into a sequence of frame images, obtaining a corresponding source image at each display time point and performing the steps S1-S3:

S1, obtaining a spatial position, orientation and size of each display screen;

S2, determining a display source image corresponding to each display screen, expanding the display screen on a plane of the display source image, and obtaining a corresponding segmentation area of each display screen in the source image according to a corresponding relationship between an expanded geometric shape of the display screen and the source image set by a user;

S3, performing the following operations in cycles for each display screen:

S31, segmenting the corresponding segmentation area of the display screen from the source image;

S32, adding a content of the corresponding segmentation area to a stage screen control video file corresponding to the display screen;

S4. when to display, the display controller reading the stage screen control video file containing all time points and outputting it to the display screen.

At each display time point, in step S32, the content of the segmentation area is added to the stage screen control video file. When to display, the stage screen control video file containing all time points is output to the display controller. That is to complete the conversion and storage of the source video before the performance. when performing, the processed stage screen control video file is directly output to the display controller, so that the video background display effect of the dynamic stage of the large-scale performance can be realized.

When converting the source video file to the stage screen control video file, the most important thing is to keep the time and space relationship between the stage screen control video file and the screen display consistent: time consistency means that each stage screen control video file is composed of the display content at different display time points arranged in order, and the space consistency means that each stage screen control video file corresponds to the specific display screen in the stage space, and only contains the display content in the corresponding display screen. The stage screen control video file is completely different from the source video. If the stage screen control video file is played directly on an ordinary computer, it will be trivial and messy and difficult to understand, but if it is output to the display controller of the dynamic stage, the output of the display screen can be correctly controlled, and the combination of multiple display screens can display the correct video background.

According to a specific implementation of an embodiment of the present disclosure, before step S3, the source image is read into a source memory; in the step S3, a method of segmenting the corresponding segmentation area of the display screen from the source image is as follows: allocating target memory space for the display screen, obtaining source memory address space corresponding to the segmentation area according to an offset of each pixel in the corresponding segmentation area of the display screen in the source image relative to an image origin, and copying a content of the address space to the target memory in an order of pixels of the display screen.

Figure 6:
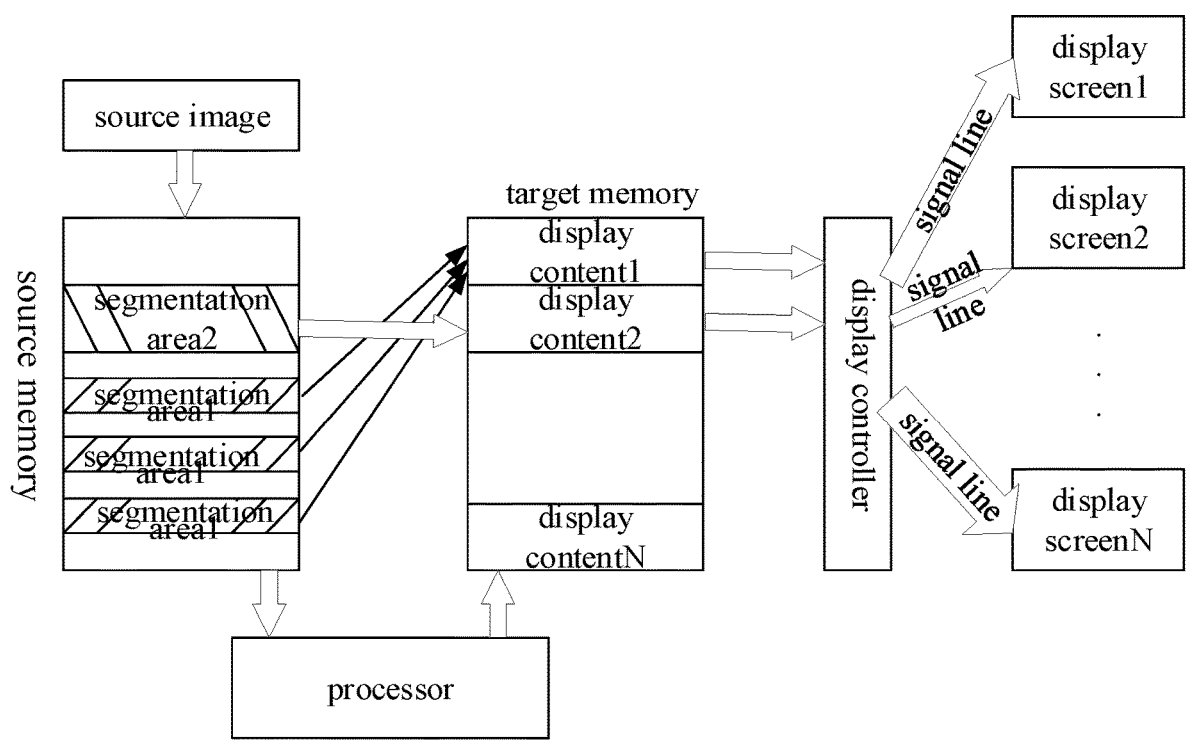
FIG. 6 is a data flow diagram of image background mapping of a display extraction output unit of the virtual stage based on parallel simulation.

FIG. 6 shows a data flow diagram for segmentation and conversion of a source image according to a specific implementation of an embodiment of the present disclosure. As shown in FIG. 6, when the dynamic stage digital display mapping is to be performed, the frame image is firstly read into the source memory, and the content of the source memory remains unchanged during the processing and displaying of all display screens. After obtaining the corresponding segmentation area of each display screen in the source image, the offset of each pixel in the area relative to the image origin can be calculated from the segmentation area, and the source memory address corresponding to the pixel can be obtained. The source memory address units corresponding to all pixels in the segmentation area are combined to form the source memory address space corresponding to the segmentation area. The source memory address space corresponding to the segmentation area may be a continuous address space in the source memory, as shown in the segmentation area 2 in FIG. 6. Alternatively, it may be some discrete address spaces in the source memory, as shown in the segmentation area 1 in FIG. 6. After obtaining the source memory address space of the segmentation area corresponding to each display screen, the contents of the address space need to be copied to the target memory in the order of the pixels of the display screen, so that the contents of the target memory and the stage display screen are kept to be spatially consistent. Finally, the contents of the target memory are output to the display controller.

Figure 7:
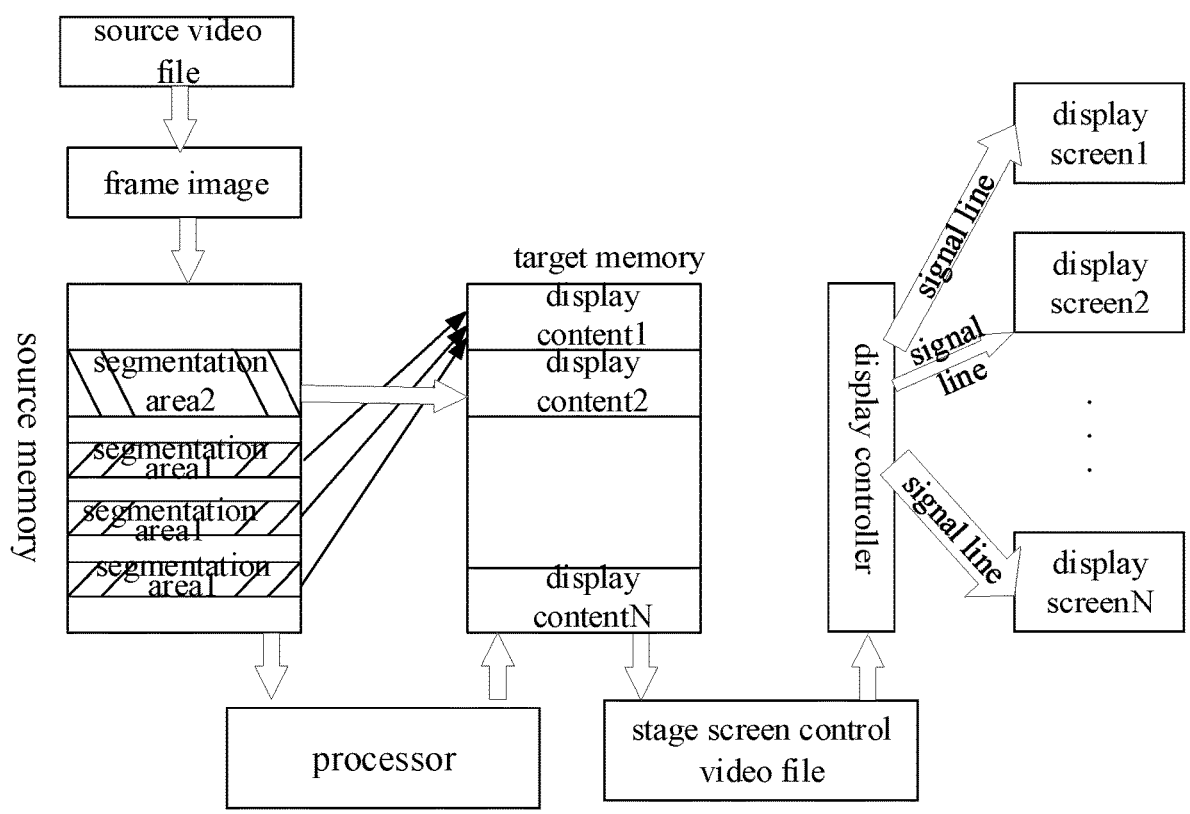
FIG. 7 is a data flow diagram of video background mapping of a display extraction output unit of the virtual stage based on parallel simulation.

FIG. 7 shows a data flow diagram of a source video background segmentation conversion according to a specific implementation of an embodiment of the present disclosure. The main difference between image and video background conversion is that the video background conversion completes the conversion of the source video before the performance and stores it to the stage screen control video file. When performing, the processed stage screen control video file is directly output to the display controller.

According to a specific implementation of an embodiment of the present disclosure, the virtual stage based on parallel simulation further comprising a step of performing image editing on the segmentation area.

During the display process of the display screen, it is often needed to transform the content of the source memory, that is, the output content of the display screen is not a simple copy of the source image. At this time, the content of the segmentation area of the source memory needs to be transformed accordingly by a processor, such as image editing such as rotation, toning, and zooming. For example, if the segmentation area corresponding to the source image is inconsistent with the resolution of the display screen, the segmentation area copied to the target memory space needs to be zoomed so that the zoomed segmentation area is consistent with the resolution of the display screen.

According to a specific implementation of an embodiment of the present disclosure, all the display screens are grouped according to their positions, and the display controllers of each group of display screens are combined; in the step S3, allocates the target memory space for each group of display screens, copy the corresponding segmentation area of each display screen in the group to the target memory space in an arrangement order of the display screens, and finally output a stored content in the target memory space to the display controller of the group of display screens.

One of the difficulties faced by large-scale performance dynamic stages is the management of a large number of display controllers of display screens. The simplest case is to set up a display controller for each display screen, but this requires separate management programs and processes for each display screen. For example, allocate target memory space for each display screen to copy the display controller, and then proceed to the management process of the next display screen. In this way, the target memory space corresponding to the display screen can be recycled after it is used up. The occupied space of the target memory is small, but the system hardware and wiring are complicated, and frequent switching in each display screen control process is required, resulting in low efficiency. Another way is shown in FIG. 6 and FIG. 7, by setting up a display controller for all the display screens, the system hardware structure and management procedures are very simple. However, due to the huge number of display screens involved in large-scale performances, it is needed to allocate too large target memory spaces; In addition, when copying the target memory to the display controller, it takes a long time to copy each time due to too much space, which cannot meet the real-time display requirements of large-scale performances.

In order to solve the problem of managing a large number of display controllers of the display screens, according to a specific implementation of an embodiment of the present disclosure, a method of grouping the display screens is adopted. In order to facilitate the hardware and wiring, the principle of grouping is based on the positions of the display screens. Although the display screen changes dynamically during the performance, generally speaking it will move in a local range. The display screens in close positions are grouped, and the display screens in the same group share one display controller, which will bring convenience and conciseness for wiring and simplify the hardware management of the display controller. After the display screens are grouped, each group is used as the basic unit for allocating target memory space and for copying the display controller, which will bring a balance of time and space efficiency. When the target memory space is allocated, according to specific hardware resources, for example, the target memory space of 5 display screen groups can be allocated at the same time. When a certain group is processed, the occupied memory is released, and other groups obtain memory resources for corresponding data processing. When the memory is allocated according to the grouping of display screens, it is needed to copy the corresponding segmentation area of each display in the group to the target memory space according to the arrangement order of the display screens, and finally the storage content in the target memory space is output to the display controller of the group of display screens.

According to a specific implementation of an embodiment of the present disclosure, for a multi-layered stage with occlusion relationship, an occluded group of display screens does not perform a target memory copy operation; in a process of outputting the target memory to the display controller, directly reuse the content of the target memory of the unoccluded group of display screens with positions at the forefront.

As shown in FIG. 4, for the three-dimensional dynamic stage of a large-scale performance, the lifting platform is divided into many layers, which often have an occlusion relationship. For the audience, only the forefront display screen can be seen, and the rear-row display screen is actually invisible to the audience because it is occluded. However, if the occluded display screen does not contain any display signals, it will become a black screen, which may be displayed during the movement of the display screen, which will greatly affect the stage background effect. A better way to deal with it is to reuse the display information of the front display screen on the rear-row display screen, so that the best stage background effect can be obtained. In the display process of the display screen, the consumption of space and time resources is mainly reflected in allocating target memory for the display screen, and determining the display content of the display screen according to the segmentation area and writing the display content into the target memory. According to a specific implementation of an embodiment of the present disclosure, when the rear-row display screen reuse the display information of the front display screen, the target memory copy operation is not performed; in a process of outputting the target memory to the display controller, the content of the target memory of the unoccluded group of display screens with positions at the forefront is directly reused. In this way, while setting appropriate display information for the rear-row display screen, the time and space resources of the system are greatly saved.

According to a specific implementation of an embodiment of the present disclosure, an output sequence of the groups of display screens is arranged so that the multi-layered stage with occlusion relationship is output in an order from front to back, and a shared target memory space for a corresponding group of display screens is allocated; in the step S3, firstly determine whether the group of display screens is occluded, and directly reuse an existing content of the shared target memory space for the occluded group of display screens.

For display screens that have an occlusion relationship, the rear-row display screen can reuse the display information of the front display screen. In this case, the display efficiency can be improved. Therefore, in order to improve the overall display efficiency of the dynamic stage, according to a specific implementation of an embodiment of the present disclosure, an output sequence of the groups of display screens is arranged so that the multi-layered stage with occlusion relationship is output in an order from front to back, and a shared target memory space for a corresponding group of display screens is allocated. In step S3, firstly determine whether the group of display screens is occluded, and directly reuse an existing content of the shared target memory space for the occluded group of display screens. Before the display screen outputs, the output sequence of the groups of display screens is arranged in advance, so that all the occluded group of display screens can reuse the front-row display information. Due to the large number of occlusions in the dynamic stage of large-scale performances, the digital display efficiency of the stage can be greatly improved.

The virtual stage based on parallel simulation proposed in the present disclosure also comprises a monitoring unit that collects actual stage data in real time, as shown in FIG. 2. According to a specific implementation of an embodiment of the present disclosure, the virtual stage based on parallel simulation further comprises a motion monitoring unit for measuring the motion state data of the actual stage using various sensors and performing analysis and comparison.

According to a specific implementation of an embodiment of the present disclosure, the virtual stage based on parallel simulation further comprises a display monitoring unit, which is used to set up a capture card on the actual stage, collect LED video images and return them to the virtual stage for analysis and comparison.

In some embodiments, the motion monitoring unit or the display monitoring unit may be implemented as an image collector such as a camera.

In some embodiments, the virtual stage based on parallel simulation may comprise a memory and a processor. The memory may store executable programs, such as program modules, program segments, or program codes. The executable program may comprise one or more of the above-mentioned stage modeling unit, motion simulation unit, display simulation unit, data extraction output unit, styling extraction output unit, motion extraction output unit, and display extraction output unit. That is, one or more of the above-mentioned stage modeling unit, motion simulation unit, display simulation unit, data extraction output unit, styling extraction output unit, motion extraction output unit, and display extraction output unit may be implemented as program modules, program segment, or program code, etc. The processor may be configured to execute one or more of the above-mentioned executable programs stored on the memory to implement the functions or methods described above. The memory is, for example, RAM, ROM, magnetic disk, or optical disk. The processor is, for example, a microcomputer, a single-chip microcomputer, or a field programmable gate array.

Embodiment 2

Figure 9:
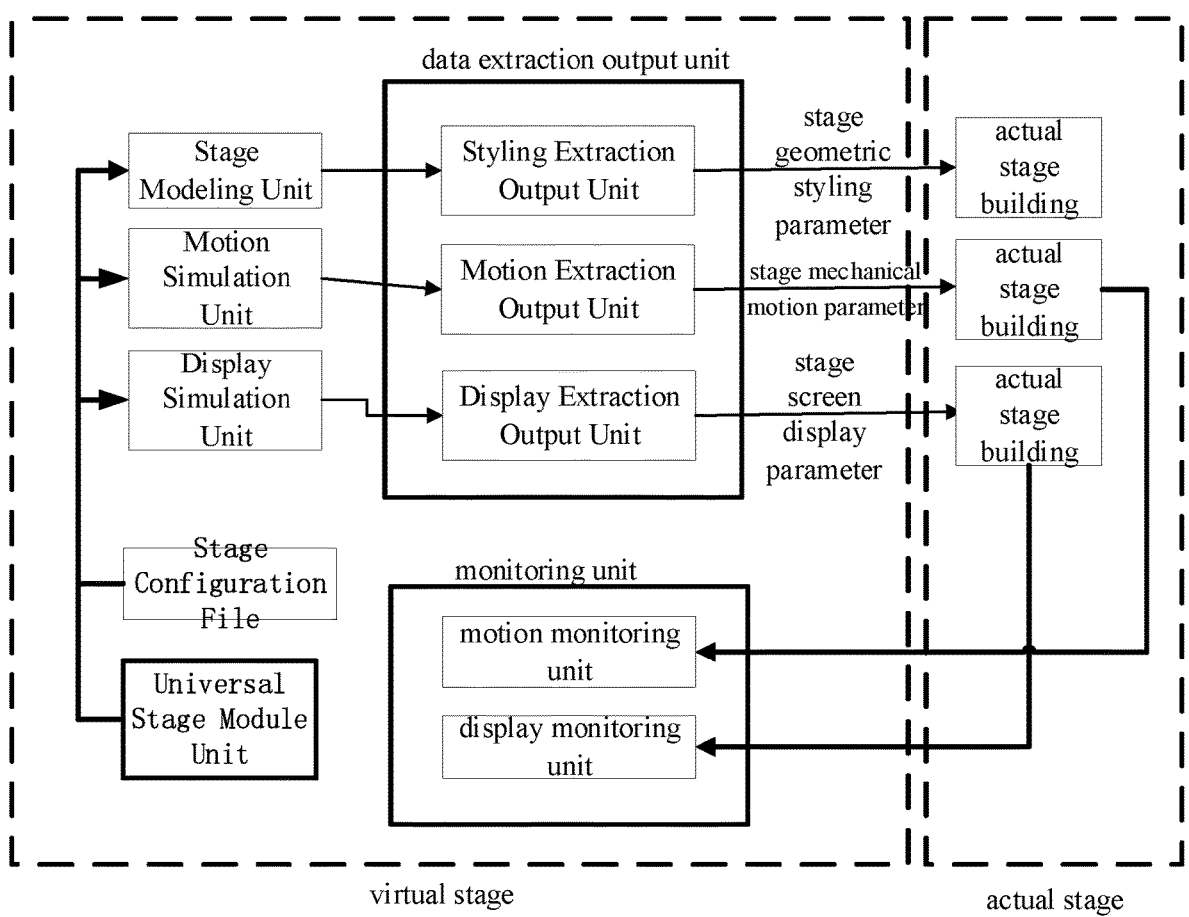
FIG. 9 is a schematic diagram of a general virtual stage.

This embodiment provides a universal virtual stage, that is, a universal virtual stage parallel simulation system, as shown in FIG. 9, comprising a stage configuration file, a universal stage module unit, a stage modeling unit, a motion simulation unit, a display simulation unit, and a data extraction output unit.

The stage configuration file is configured to write specific stage related parameters, for example, the type, number, position and shape distribution of the stage universal module comprised in the specific stage.

The universal stage module unit is configured to establish a universal stage module in the simulation system and encapsulate 3D drawing function of the universal stage module. The universal stage module unit establishes a virtual model of the universal stage module through 3D modeling software such as Unity, Unreal Engine, Solid-Works, etc., and realizes the functions related to the 3D drawing of the virtual model such as material drawing, veneering, rendering, etc. Then, in the 3D modeling software, the virtual model and the model-related 3D drawing function are encapsulated into an object, which contains the virtual model entity and the corresponding 3D drawing function.

The stage modeling unit is configured to model stage styling by using the universal stage module according to the stage configuration file. The stage modeling unit uses 3D modeling software such as Unity, Unreal Engine, Solid-Works, etc. to establish a virtual model of each stage lifting platform, and further establish a virtual model of the entire stage. The parameters of the virtual model of the stage correspond exactly to the actual stage. Since the universal stage module unit has established the virtual model of the universal stage module, when the stage modeling unit establishes the virtual model, it can directly combine the virtual models of the universal stage module units corresponding to the type, number and position and shape distribution according to the stage configuration file.

The motion simulation unit is configured to simulate a motion of the universal stage module in the simulation system according to the stage configuration file. The motion simulation unit obtains the stage composition according to the stage configuration file, and establishes the motion parameters of each universal stage module unit, and drives the motion of each universal stage module unit in the simulation engine software such as Unity and Unreal Engine, so as to simulate the motion of the actual stage.

The display simulation unit is configured to simulate LED screen display of the universal stage module in the simulation system according to the stage configuration file. Since the surface of the universal stage module is affixed with a display screen, the display simulation unit uses the texture pattern to simulate the LED screen display of the actual stage by covering the surface of the virtual model of the universal stage module with a texture.

The data extraction output unit comprising a styling extraction output unit, a motion extraction output unit and a display extraction output unit, is configured to extract data of each universal stage module from the simulation system for processing and conversion, and output geometric styling parameters of each actual stage module, stage mechanical motion parameters, and stage LED screen display parameters. The data extraction output unit obtains and outputs various parameters of the virtual stage model of each universal stage module from the simulation engine software, so that these parameters can be used to design, control, and monitor and compare the actual stage.

According to a specific implementation of an embodiment of the present disclosure, one stage module can correspond to one aforementioned lifting platform.

According to the solution proposed in Embodiment 2, the universal virtual stage realizes the simulation and monitoring of the stage geometric styling, the motion process and the screen display through the reusable "universal stage module". The virtual stage in the prior art usually provides a simulation of the overall styling of the stage. In this way, it is needed to model and render each stage type used in each performance, and it is impossible to realize the reuse of the model. By constructing a universal stage module, one can achieve virtual stage modeling like building blocks in a componentized manner. Since the motion of the actual stage module is controlled by mechanical slides, a stage module designed to be too small will greatly increase the complexity of the control mechanism of the actual stage; and a stage module designed to be too large is not conducive to the reuse of different types of stage modules. Therefore, when designing the size specification of the stage module, it is needed to balance the reusability of the stage module and the complexity of the control mechanism. In the parallel simulation system, the virtual stage module and the actual stage module have a one-to-one correspondence. Therefore, by testing and verifying various specifications of stage modules in the universal stage module unit, it is possible to provide reference and basis for stage machinery manufacturers to design and produce some stage module equipment with standard specifications.

The universal stage module unit is independent of the specific stage, focusing on the encapsulation of the 3D drawing function of the universal stage module. The user sets specific stage-related parameters in a special stage configuration file, and the combination of the stage configuration file and the universal stage module unit achieves the simulation and control of the modeling, motion, and display process of the specific stage.

The universal virtual stage can play a role in assisting stage design in the period of geometric styling design of the physical stage. The stage modeling unit reads specific stage-related parameters from the stage configuration file, and conducts virtual stage geometric styling design. Since the universal stage module unit has encapsulated the most complex 3D drawing functions, it greatly simplifies the work of the stage modeling unit. After the modeling is completed, the geometric styling parameters of each stage module are extracted from the simulation system through the styling extraction output unit, and the actual stage is built according to the geometric styling parameters.

During the dynamic operation of the stage, the motion simulation unit reads specific stage-related parameters from the stage configuration file and simulates the stage motion animation. After obtaining satisfactory results in the simulation system, the motion extraction output unit extracts the mechanical motion parameters of each universal stage module from the simulation system, such as spatial position, speed, acceleration, etc., and controls the operation of the actual stage machinery according to the extracted mechanical motion parameters.

During the stage LED screen background display process, the display simulation unit reads specific stage-related parameters from the stage configuration file, and simulates the LED screen display of the universal stage module. After obtaining satisfactory results, the display parameters of each LED screen veneering of each stage module are extracted from the simulation system through the display extraction output unit, and the LED screen display of the actual stage is controlled.

According to a specific implementation of an embodiment of the present disclosure, the display extraction output unit comprises a module that maps the stage image background to the display data of each display screen in the stage, and the specific mapping method comprises the following steps:

S1, obtaining a spatial position, orientation and size of each display screen in each stage module;

S2, determining a display source image corresponding to each display screen of the stage module, expanding the display screen on a plane of the display source image, and obtaining a corresponding segmentation area of each display screen in the source image according to a corresponding relationship between an expanded geometric shape of the display screen and the source image set by a user;

S3, performing the following operations in cycles for each display screen:

S31, segmenting the corresponding segmentation area of the display screen from the source image;

S32, outputting a content of the corresponding segmentation area to a display controller of the display screen;

S33, outputting an image content of the display controller to the display screen.

FIG. 3, FIG. 4 and FIG. 5 show three dynamic stages respectively. As shown in FIG. 3, FIG. 4, and FIG. 5, the large-scale performance dynamic stage is composed of multiple lifting platforms. The lifting platforms may be cubes, cuboids, or other special shapes. Each lifting platform of the stage is connected with a sliding rail, and the lifting platform is controlled to move forward and backward, left and right, or up and down through the mechanical sliding rail. By controlling the movement of the lifting platform, different stage stylings can be formed. In the stage shown in FIG. 4, the top and sides of each lifting platform are equipped with LED display screens that can play video. Similar to controlling the display output by a graphics card, in order to control the display of the LED display screens, each LED display screen has a signal line connected with the display controller. The broadcaster controls the display content of each LED display screen by outputting the display signal to the display controller.

Since the dynamic stage contains multiple stage modules, the contents output by the LED screens on the surface of each stage module cooperate to form the overall background of the stage. In large-scale performances, the number of LED display screens installed on the stage modules is huge, often containing thousands of display screens of various sizes. If the display content is designed separately for each display screen, it will undoubtedly consume huge manpower and material resources, and increase the design difficulty of the stage designer, and it is difficult to guarantee the final composite effect of all the display screens.

According to this embodiment, the display extraction output unit comprises a module that maps the stage image background to the display data of each display screen in the stage. The stage designer does not need to design the display content for each display screen separately, but regards the stage styling formed by all stage modules as a whole, and the background is designed according to the overall display effect of the stage. For example, if all the stage modules constitute a large flat screen, the designer only needs to design the background displayed on this large screen. Different positions of the complex stage may display different images, such as the sky image on the top 3D stage, the forest image on the ground 3D stage, etc. Designers need to create multiple source images for the stage background. The stage shown in FIG. 4 is all made up of a cube stage modules, that is, the display screens installed on the top and sides of the stage module may have five orientations: top, left, right, front, and back. The display contents of the display screens with same orientations will be combined to form the stage background in that orientation. Audiences at different positions of the stage see different display screens, that is, different stage backgrounds. Therefore, designers need to design different source images for each orientation, that is, design five source images for the stage shown in FIG. 4. For complex stage stylings, for example, a plurality of partial 3D dynamic stage stylings shown in FIG. 4 are arranged in the overall stage, five source images need to be designed for each partial 3D stage.

For stage designers, there is no need to care about how the display screens of the stage modules are designed and installed, but only needs to know the stage styling at a specific moment and design the source images as the overall background of the stage.

The display extraction output unit comprises a module that maps the stage image background to the display data of each display screen in the stage. The specific mapping method comprises the following steps:

S1. Obtain the spatial position, orientation and size of each display screen for each stage module.

After the stage designer designs the source images as the overall background of the stage, the stage technician needs to accurately map the source images to each LED display screen of the stage modules. In order to perform accurate mapping, a specific stage styling needs to be obtained firstly.

Since each stage module in the dynamic stage moves with time, the first need is to obtain the position and shape and size data of the stage module at the specific moment of the mapping, and the position, orientation and size data of each screen installed on the stage module are further obtained. The position, orientation and size data of each screen installed on each stage module can be easily obtained by the styling extraction output unit and the motion extraction output unit through the universal virtual stage parallel simulation system, S2. Determine a display source image corresponding to display screen of the stage module, expand the display screen on a plane of the display source image, and obtain a corresponding segmentation area of each display screen in the source image according to a corresponding relationship between an expanded geometric shape of the display screen and the source image set by a user.

In order to establish the corresponding relationship between the source image and the display screen of the stage module, after obtaining the spatial position and size of each display screen, the display screen needs to be expanded on the corresponding plane of the source image. It should be noted that even if there are multiple display screens installed on the same surface of the stage module, since each display screen has a different orientation, the corresponding source images are also different. In the dynamic stage as shown in FIG. 4, the 5 display screens on the surface of each stage module correspond to 5 source images, respectively. Therefore, before expanding, it requires to determine the source image to be displayed corresponding to each display screen. This corresponding relationship can be automatically determined by a program. For example, in a dynamic stage as shown in FIG. 4, the corresponding source image to be displayed can be determined by the orientation of each display screen. In some dynamic stages, the user needs to specify the corresponding source image to be displayed. For example, FIG. 5 shows a stage module arranged in a cylindrical shape. There are multiple cylinders included in the overall stage, and each cylinder is composed of the stage module arrangement as shown in FIG. 5. The user can specify each cylinder to display one specific image.

After the source image to be displayed corresponding to each display screen is established, the display screen needs to be expanded on the plane of the source image to be displayed. The specific expanding strategy is set by the user according to the stage characteristics and stage design. For example, for the dynamic stage shown in FIG. 4, it can be expanded by projection, that is, each display screen is projected on the plane of the source image to be displayed. For the cylindrical stage shown in FIG. 5, all the display screens parallel to the cylindrical surface can be tiled and expanded, and the adjacent display screens are seamlessly connected. After expanding, a rectangle is obtained, and then the source images designed by the stage designer and needed to be displayed on the cylindrical surface is mapped on this rectangle.

After the display screen of the stage module is expanded on the plane of the source image to be displayed, it is also needed to set the corresponding relationship between the expanded geometric shape of the display screen and the source image. For example, in the dynamic stage as shown in FIG. 4, after all the display screens are projected on the corresponding plane of the source image, the expanded geometric shape obtained may not be a rectangle. The user can set the largest rectangle that can be formed by the projection of the display screen to correspond to the source image according to the motion range of the display screen. Alternatively, the user can obtain a minimum rectangle that contains all the projections of the display screen at each specific moment during the movement of the display screen, and set the rectangle to correspond to the source image. Since the geometric shape after expanding is not a complete rectangle, the designer needs to take into account during the design process that the movement of the stage module may cause part of the content of the source image to be missing. In the dynamic stage shown in FIG. 5, the rectangle obtained by tiling and expanding all the display screens parallel to the cylindrical surface corresponds to the source image that needs to be displayed on the cylindrical surface, and an effect that the designed source image is wrapped on the cylindrical surface can be obtained.

S3. Perform the following operations in cycles for each display screen:

S31, segment the corresponding segmentation area of the display screen from the source image;

S32, output a content of the corresponding segmentation area to a display controller of the display screen;

S33, output an image content of the display controller to the display screen.

After obtaining the corresponding segmentation area of each display screen in the source image in step S2, the step S3 needs to segment the to-be-displayed content of each display screen from the source image and transmit it to the display screen for output. Similar to the graphics card controlling the display output, each LED display screen of the dynamic stage also needs to be connected to the display controller through a signal line. The stage technicians output the content to be displayed on each display screen to the display controller, and the display screen obtains and outputs the content to be output, from the display controller through the signal line.

Under ideal conditions, at each display time point, the source image is converted and output to the display screen in real time, so that the dynamic video background can be seen on the display screen of the dynamic stage. However, in actual situations, because the dynamic stage of a large-scale performance involves hundreds of high-resolution display screens, the video files are huge, and it takes a long time to convert, copy, and output each frame of source image. Therefore, if the video frame image is converted and output at each specific moment of display, the frame rate required for video output cannot be reached, that is, the effect of real-time video background display cannot be achieved.

According to a specific implementation of an embodiment of the present disclosure, the display extraction output unit comprises a module that maps the stage video background to the display data of each display screen in the stage. The specific mapping method is: decomposing a video into a sequence of frame images, obtaining a corresponding source image at each display time point and performing the steps S1-S3:

S1, obtaining a spatial position, orientation and size of each display screen in each stage module;

S2, determining a display source image corresponding to each display screen of the stage module, expanding the display screen on a plane of the display source image, and obtaining a corresponding segmentation area of each display screen in the source image according to a corresponding relationship between an expanded geometric shape of the display screen and the source image set by a user;

S3, performing the following operations in cycles for each display screen:

S31, segmenting the corresponding segmentation area of the display screen from the source image;

S32, adding a content of the corresponding segmentation area to a stage screen control video file corresponding to the display screen;

S4. when to display, the display controller reading the stage screen control video file containing all time points and outputting it to the display screen.

At each display time point, in step S32, the content of the segmentation area is added to the stage screen control video file. When to display, the stage screen control video file containing all time points is output to the display controller. That is to complete the conversion and storage of the source video before the performance. when performing, the processed stage screen control video file is directly output to the display controller, so that the video background display effect of the dynamic stage of the large-scale performance can be realized.

When converting the source video file to the stage screen control video file, the most important thing is to keep the time and space relationship between the stage screen control video file and the screen display consistent: time consistency means that each stage screen control video file is composed of the display content at different display time points arranged in order, and the space consistency means that each stage screen control video file corresponds to the specific display screen in the stage space, and only contains the display content in the corresponding display screen. The stage screen control video file is completely different from the source video. If the stage screen control video file is played directly on an ordinary computer, it will be trivial and messy and difficult to understand, but if it is output to the display controller of the dynamic stage, the output of the display screen can be correctly controlled, and the combination of multiple display screens can display the correct video background.

According to a specific implementation of an embodiment of the present disclosure, before step S3, the source image is read into a source memory; in the step S3, a method of segmenting the corresponding segmentation area of the display screen from the source image is as follows: allocating target memory space for the display screen, obtaining source memory address space corresponding to the segmentation area according to an offset of each pixel in the corresponding segmentation area of the display screen in the source image relative to an image origin, and copying a content of the address space to the target memory in an order of pixels of the display screen.

FIG. 6 shows a data flow diagram for segmentation and conversion of a source image according to a specific implementation of an embodiment of the present disclosure. As shown in FIG. 6, when the dynamic stage digital display mapping is to be performed, the frame image is firstly read into the source memory, and the content of the source memory remains unchanged during the processing and displaying of all display screens. After obtaining the corresponding segmentation area of each display screen in the source image, the offset of each pixel in the area relative to the image origin can be calculated from the segmentation area, and the source memory address corresponding to the pixel can be obtained. The source memory address units corresponding to all pixels in the segmentation area are combined to form the source memory address space corresponding to the segmentation area. The source memory address space corresponding to the segmentation area may be a continuous address space in the source memory, as shown in the segmentation area 2 in FIG. 6. Alternatively, it may be some discrete address spaces in the source memory, as shown in the segmentation area 1 in FIG. 6. After obtaining the source memory address space of the segmentation area corresponding to each display screen, the contents of the address space need to be copied to the target memory in the order of the pixels of the display screen, so that the contents of the target memory and the stage display screen are kept to be spatially consistent. Finally, the contents of the target memory are output to the display controller.

FIG. 7 shows a data flow diagram of a source video background segmentation conversion according to a specific implementation of an embodiment of the present disclosure. The main difference between image and video background conversion is that the video background conversion completes the conversion of the source video before the performance and stores it to the stage screen control video file. When performing, the processed stage screen control video file is directly output to the display controller.

According to a specific implementation of an embodiment of the present disclosure, the universal stage module unit is implemented in a componentized manner, and each universal stage module is initialized as a software component, and 3D rendering data of the module is encapsulated inside the component, which is responsible for realization of 3D scene drawing of this module, and the virtual stage realizes management of the stage modules by loading and unloading components and switching between components and informs a selected stage module to realize 3D scene drawing through message distribution.

By means of componentization, the stage module intensively encapsulates the 3D rendering data of this module and the specific 3D scene drawing function, which greatly simplifies the overall system design of the virtual stage. The stage modeling unit of the virtual stage can add the stage module at the corresponding position of the virtual stage by loading the component and obtaining the specific stage-related parameters of the component through the stage configuration file when loading; can delete the stage module by uninstalling the component; can select the specific stage module that needs to be rendered by switching between the components, so as to realize the management of the stage module. The stage modeling unit informs the selected stage module to implement 3D scene drawing through message distribution. For the stage modeling unit, there is no need to care about the implementation of specific drawing, but only need to provide the basic context environment for 3D rendering and be responsible for message distribution. The realization of the specific rendering function is specifically realized by the universal stage module unit.

According to a specific implementation of an embodiment of the present disclosure, the stage configuration file comprises a list of stage modules comprised in a specific stage, parameters of each stage module in the list comprising a size specification, a motion direction, a speed limit, and screen resolutions of six surfaces of up, down, left, right, front and rear. If a display screen is not installed on a certain surface of the stage module, the resolution of the display screen can be set to 0. Through the stage configuration file, the specific stage independence of the universal stage module unit can be realized, and the versatility and reusability of the universal stage module can be improved.

According to a specific implementation of an embodiment of the present disclosure, the stage configuration file further comprises an operation sequence of loading, unloading, and switching of stage modules, and the stage modeling unit performs automated stage modeling according to the operation sequence.

The use of componentization can also bring an advantage, that is, the stage modeling process can be simplified. Skilled person in the simulation field knows that modeling is a very complex task, and modeling for each type of the stage changes means a huge workload. By means of componentization, the user can map the process of using the stage module to generate a virtual stage into an operation sequence of loading, unloading, and switching multiple stage modules, and perform automated stage modeling according to the operation sequence. The modeling of the stage module only needs to be done once. When using the stage module to build the stage, one only need to define the corresponding operation sequence, and the stage modeling can be completed automatically. The user can save the operation sequence in the stage configuration file, and only need to modify the operation sequence in the stage configuration file when modifying the stage type, which greatly simplifies the user's modeling work.

According to a specific implementation of an embodiment of the present disclosure, the stage configuration file further comprises background configuration parameters; the background configuration parameters comprising, for an image background, a path and resolution of a source image file, a corresponding source image file for each display screen, and a corresponding relationship between each source image and a stage space; and, for a video background, a path and resolution of a source video file and a stage screen control video file, a source video file and a stage screen control video file corresponding for each display screen, and a corresponding relationship between each source video and the stage space.

The massive LED screens attached to the surface of the stage module means that the virtual stage parallel simulation system needs to manage the generation and monitoring of massive display information, and the information displayed on these screens is data related to time and space, which is very closely related to the specific stage type. According to a specific implementation of an embodiment of the present disclosure, the display information is analyzed and organized, and the image or video background configuration parameters related to the specific stage are stripped and stored in the stage configuration file. The image or video background configuration parameters comprise, for an image background, a path and resolution of a source image file, a corresponding source image file for each display screen, and a corresponding relationship between each source image and a stage space; and, for a video background, a path and resolution of a source video file and a stage screen control video file, a source video file and a stage screen control video file corresponding for each display screen, and a corresponding relationship between each source video and the stage space. In this way, the virtual stage is divided into two independent parts, that is, the stage configuration file and the universal virtual stage independent of the specific stage, thereby greatly improving the versatility and maintainability of the virtual stage.

According to a specific implementation of an embodiment of the present disclosure, the universal virtual stage parallel simulation system further comprises a motion monitoring unit for measuring the motion state data of the actual stage using various sensors and performing analysis and comparison.

According to a specific implementation of an embodiment of the present disclosure, the universal virtual stage parallel simulation system further comprises a display monitoring unit, which is used to set up a capture card on the actual stage, collect LED video images and return them to the virtual stage for analysis and comparison.

In some embodiments, the motion monitoring unit or the display monitoring unit may be implemented as an image collector such as a camera.

According to a specific implementation of an embodiment of the present disclosure, the universal virtual stage parallel simulation system further comprising a step of performing image editing on the segmentation area.

During the display process of the display screen, it is often needed to transform the content of the source memory, that is, the output content of the display screen is not a simple copy of the source image. At this time, the content of the segmentation area of the source memory needs to be transformed accordingly by a processor, such as image editing such as rotation, toning, and zooming. For example, if the segmentation area corresponding to the source image is inconsistent with the resolution of the display screen, the segmentation area copied to the target memory space needs to be zoomed so that the zoomed segmentation area is consistent with the resolution of the display screen.

According to a specific implementation of an embodiment of the present disclosure, all the display screens are grouped according to their positions, and the display controllers of each group of display screens are combined; in the step S3, allocates the target memory space for each group of display screens, copy the corresponding segmentation area of each display screen in the group to the target memory space in an arrangement order of the display screens, and finally output a stored content in the target memory space to the display controller of the group of display screens.

One of the difficulties faced by large-scale performance dynamic stages is the management of a large number of display controllers of display screens. The simplest case is to set up a display controller for each display screen, but this requires separate management programs and processes for each display screen. For example, allocate target memory space for each display screen to copy the display controller, and then proceed to the management process of the next display screen. In this way, the target memory space corresponding to the display screen can be recycled after it is used up. The occupied space of the target memory is small, but the system hardware and wiring are complicated, and frequent switching in each display screen control process is required, resulting in low efficiency. Another way is shown in FIG. 6 and FIG. 7, by setting up a display controller for all the display screens, the system hardware structure and management procedures are very simple. However, due to the huge number of display screens involved in large-scale performances, it is needed to allocate too large target memory spaces; In addition, when copying the target memory to the display controller, it takes a long time to copy each time due to too much space, which cannot meet the real-time display requirements of large-scale performances.

In order to solve the problem of managing a large number of display controllers of the display screens, according to a specific implementation of an embodiment of the present disclosure, a method of grouping the display screens is adopted. In order to facilitate the hardware and wiring, the principle of grouping is based on the positions of the display screens. Although the display screen changes dynamically during the performance, generally speaking it will move in a local range. The display screens in close positions are grouped, and the display screens in the same group share one display controller, which will bring convenience and conciseness for wiring and simplify the hardware management of the display controller. After the display screens are grouped, each group is used as the basic unit for allocating target memory space and for copying the display controller, which will bring a balance of time and space efficiency. When the target memory space is allocated, according to specific hardware resources, for example, the target memory space of 5 display screen groups can be allocated at the same time. When a certain group is processed, the occupied memory is released, and other groups obtain memory resources for corresponding data processing. When the memory is allocated according to the grouping of display screens, it is needed to copy the corresponding segmentation area of each display in the group to the target memory space according to the arrangement order of the display screens, and finally the storage content in the target memory space is output to the display controller of the group of display screens.

According to a specific implementation of an embodiment of the present disclosure, for a multi-layered stage with occlusion relationship, an occluded group of display screens does not perform a target memory copy operation; in a process of outputting the target memory to the display controller, directly reuse the content of the target memory of the unoccluded group of display screens with positions at the forefront.

As shown in FIG. 4, for the three-dimensional dynamic stage of a large-scale performance, the stage module is divided into many layers, which often have an occlusion relationship. For the audience, only the forefront display screen can be seen, and the rear-row display screen is actually invisible to the audience because it is occluded. However, if the occluded display screen does not contain any display signals, it will become a black screen, which may be displayed during the movement of the display screen, which will greatly affect the stage background effect. A better way to deal with it is to reuse the display information of the front display screen on the rear-row display screen, so that the best stage background effect can be obtained. In the display process of the display screen, the consumption of space and time resources is mainly reflected in allocating target memory for the display screen, and determining the display content of the display screen according to the segmentation area and writing the display content into the target memory.

According to a specific implementation of an embodiment of the present disclosure, when the rear-row display screen reuse the display information of the front display screen, the target memory copy operation is not performed; in a process of outputting the target memory to the display controller, the content of the target memory of the unoccluded group of display screens with positions at the forefront is directly reused. In this way, while setting appropriate display information for the rear-row display screen, the time and space resources of the system are greatly saved.

According to a specific implementation of an embodiment of the present disclosure, an output sequence of the groups of display screens is arranged so that the multi-layered stage with occlusion relationship is output in an order from front to back, and a shared target memory space for a corresponding group of display screens is allocated; in the step S3, firstly determine whether the group of display screens is occluded, and directly reuse an existing content of the shared target memory space for the occluded group of display screens.

For display screens that have an occlusion relationship, the rear-row display screen can reuse the display information of the front display screen. In this case, the display efficiency can be improved. Therefore, in order to improve the overall display efficiency of the dynamic stage, according to a specific implementation of an embodiment of the present disclosure, an output sequence of the groups of display screens is arranged so that the multi-layered stage with occlusion relationship is output in an order from front to back, and a shared target memory space for a corresponding group of display screens is allocated. In step S3, firstly determine whether the group of display screens is occluded, and directly reuse an existing content of the shared target memory space for the occluded group of display screens. Before the display screen outputs, the output sequence of the groups of display screens is arranged in advance, so that all the occluded group of display screens can reuse the front-row display information. Due to the large number of occlusions in the dynamic stage of large-scale performances, the digital display efficiency of the stage can be greatly improved.

The preferred implementations of the stage modeling unit, the motion simulation unit, the display simulation unit, the data extraction output unit, etc. in Embodiment 1 can be used in this embodiment, and will not be repeated here.

In some embodiments, the universal virtual stage may comprise a memory and a processor. The memory may store executable programs, such as program modules, program segments, or program codes. The executable program may comprise one or more of the above-mentioned stage configuration file, universal stage module unit, stage modeling unit, motion simulation unit, display simulation unit, data extraction output unit, styling extraction output unit, motion extraction output unit, and display extraction output unit. That is, one or more of the above-mentioned stage configuration file, universal stage module unit, stage modeling unit, motion simulation unit, display simulation unit, data extraction output unit, styling extraction output unit, motion extraction output unit, and display extraction output unit may be implemented as program modules, program segment, or program code, etc. The processor may be configured to execute one or more of the above-mentioned executable programs stored on the memory to implement the functions or methods described above. The memory is, for example, RAM, ROM, magnetic disk, or optical disk. The processor is, for example, a microcomputer, a single-chip microcomputer, or a field programmable gate array.

Embodiment 3

This embodiment further illustrates the implementation method of the aforementioned display extraction output unit.

In large-scale performances, how to manage the editing and output of video files so that all screens can cooperate with each other to accurately display each video; how to reduce the hardware complexity of managing the LED screens; how to effectively manage the digital video mapping memory of the display screens, as well as reducing the time required for digital mapping, are all technical problems that need to be solved urgently.

For the dynamic stage used in large-scale performances, this embodiment proposes a method for editing and displaying dynamic stage video of a large-scale performance based on time-space consistency, which coordinates the control of display contents of LED display screens. It provides accurate LED screen digital mapping for the dynamic stage video background and improves utilization efficiency and mapping speed of the memory.

Figure 8:
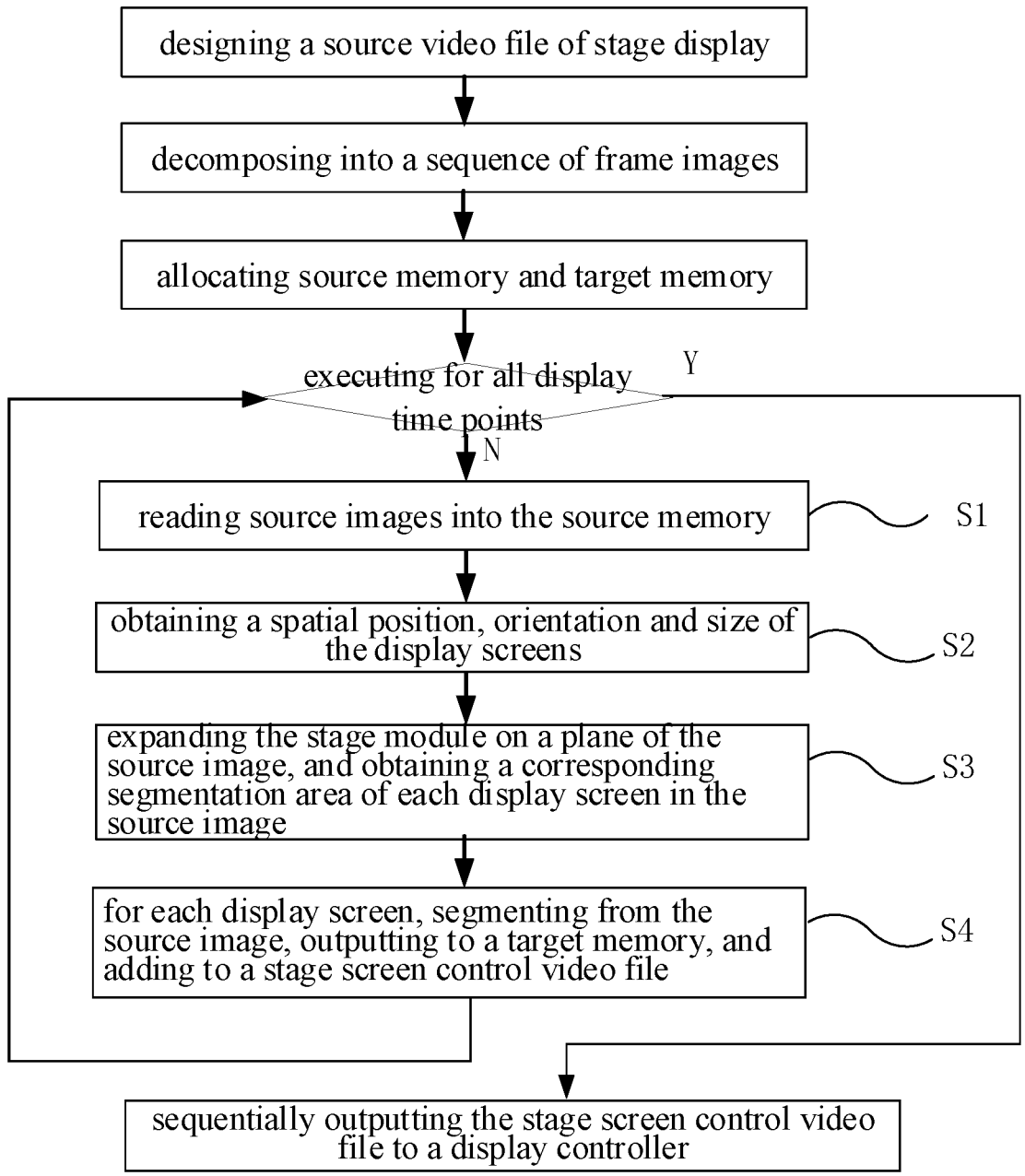
FIG. 8 is a data flow diagram of mapping the stage video background to the display data of each display screen in the stage.

In order to solve the above technical problems, this embodiment proposes a method for editing and displaying dynamic stage video of a large-scale performance based on time-space consistency, as shown in FIG. 8, comprising the following steps:

I. designing one or more source videos as a background of the stage and decomposing each source video file into a sequence of video frames, according to an overall display effect of the stage; allocating source memory for frame images and allocating target memory for a display screen.

The stage designer does not need to design the display content for each display screen separately, but regards the stage styling formed by all stage modules as a whole, and the background is designed according to the overall display effect of the stage. For example, if all the stage modules constitute a large flat screen, the designer only needs to design a video file displayed on this large screen. Different positions of the complex stage may display different videos, such as the sky video on the top 3D stage, the forest video on the ground 3D stage, etc. Designers need to create multiple source videos for the stage background. The stage shown in FIG. 4 is all made up of a cube stage module, that is, the display screens installed on the top and sides of the stage module may have five orientations: top, left, right, front, and back. The display contents of the display screens with same orientations will be combined to form the stage background in that orientation. Audiences at different positions of the stage see different display screens, that is, different stage backgrounds. Therefore, designers need to design different source videos for each orientation, that is, design five source videos for the stage shown in FIG. 4. For complex stage stylings, for example, a plurality of partial 3D dynamic stage stylings shown in FIG. 4 are arranged in the overall stage, five source videos need to be designed for each partial 3D stage.

According to a specific implementation of an embodiment of the present disclosure, one stage module can correspond to one aforementioned lifting platform.

For stage designers, there is no need to care about how the display screens of the stage module are designed and installed, but only needs to know the stage styling at a specific moment and design the source video as the overall background of the stage.

After the designer designs the source video file, the technician needs to display the video file as a background on a complex dynamic stage. Video mapping is embodied as image mapping at each specific moment. Therefore, in order to perform video mapping, each source video file needs to be decomposed into a sequence of video frames. Before image mapping, it is needed to allocate source memory for frame images and allocate target memory for the display screen.

II. setting a display time interval of the display screen and performing the following operations for each display time point:

S1. reading all frame images at this time point into the source memory;

S2. obtaining a dynamic stage styling corresponding to the time point, and obtaining a spatial position, orientation and size of each display screen in each stage module;

After obtaining the frame images as the overall background of the stage, the stage technician needs to accurately map the images to each LED display screen. In order to perform accurate mapping, the position of each stage module at the specific moment of the mapping needs to be obtained firstly. The position, orientation and size data of each screen installed on the stage modules can be further obtained from the position, shape and size data of the stage modules.

S3. determining a display source image corresponding to the display screen of the stage module, expanding the display screen on a plane of the source image, and obtaining a corresponding segmentation area of each display screen in the source image according to a corresponding relationship between an expanded geometric shape of the display screen and the source image set by a user;

In order to establish the corresponding relationship between the source image and the stage display screen, after obtaining the spatial position and size of each display screen, the display screen needs to be expanded on the corresponding plane of the source image. It should be noted that even if there are multiple display screens installed on the same surface of the stage module, since each display screen has a different orientation, the corresponding source images are also different. In the dynamic stage as shown in FIG. 4, the 5 display screens on the surface of each stage module correspond to 5 source images, respectively. Therefore, before expanding, it requires to determine the source image to be displayed corresponding to each display screen. This corresponding relationship can be automatically determined by a program. For example, in a dynamic stage as shown in FIG. 4, the corresponding source image to be displayed can be determined by the orientation of each display screen. In some dynamic stages, the user needs to specify the corresponding source image to be displayed. For example, FIG. 5 shows a stage module arranged in a cylindrical shape. There are multiple cylinders included in the overall stage, and each cylinder is composed of the stage module arrangement as shown in FIG. 5. The user can specify each cylinder to display one specific image.

After the source image to be displayed corresponding to each display screen is established, the display screen needs to be expanded on the plane of the source image to be displayed. The specific expanding strategy is set by the user according to the stage characteristics and stage design. For example, for the dynamic stage shown in FIG. 4, it can be expanded by projection, that is, each display screen is projected on the plane of the source image to be displayed. For the cylindrical stage shown in FIG. 5, all the display screens parallel to the cylindrical surface can be tiled and expanded, and the adjacent display screens are seamlessly connected. After expanding, a rectangle is obtained, and then the source images designed by the stage designer and needed to be displayed on the cylindrical surface is mapped on this rectangle.

After the display screen of the stage module is expanded on the plane of the source image to be displayed, it is also needed to set the corresponding relationship between the expanded geometric shape of the display screen and the source image. For example, in the dynamic stage as shown in FIG. 4, after all the display screens are projected on the corresponding plane of the source image, the expanded geometric shape obtained may not be a rectangle. The user can set the largest rectangle that can be formed by the projection of the display screen to correspond to the source image according to the motion range of the display screen. Alternatively, the user can obtain a minimum rectangle that contains all the projections of the display screen at each specific moment during the movement of the display screen, and set the rectangle to correspond to the source image. Since the geometric shape after expanding is not a complete rectangle, the designer needs to take into account during the design process that the movement of the lifting platform may cause part of the content of the source image to be missing. In the dynamic stage shown in FIG. 5, the rectangle obtained by tiling and expanding all the display screens parallel to the cylindrical surface corresponds to the source image that needs to be displayed on the cylindrical surface, and an effect that the designed source image is wrapped on the cylindrical surface can be obtained.

S4. performing the following operations in cycles for all display screens:

S41: segmenting the corresponding segmentation area of the display screen from the corresponding source image;

S42. outputting a content of the corresponding segmentation area to a target memory of the display screen;

S43. outputting a content of the target memory to a display controller and to the display screen.

After obtaining the corresponding segmentation area of each display screen in the source image in step S3, the step S4 needs to segment the to-be-displayed content of each display screen from the source image and transmit it to the display screen for output. Similar to the graphics card controlling the display output, each LED display screen of the dynamic stage also needs to be connected to the display controller through a signal line. The stage technicians output the content to be displayed on each display screen to the display controller, and the display screen obtains and outputs the content to be output, from the display controller through the signal line.

FIG. 7 shows a data flow diagram for segmentation and conversion of a source image according to a specific implementation of an embodiment of the present disclosure. As shown in FIG. 7, when the dynamic stage digital display mapping is to be performed, the frame image is firstly read into the source memory, and the content of the source memory remains unchanged during the processing and displaying of all display screens. After obtaining the corresponding segmentation area of each display screen in the source image, the offset of each pixel in the area relative to the image origin can be calculated from the segmentation area, and the source memory address corresponding to the pixel can be obtained. The source memory address units corresponding to all pixels in the segmentation area are combined to form the source memory address space corresponding to the segmentation area. The source memory address space corresponding to the segmentation area may be a continuous address space in the source memory, as shown in the segmentation area 2 in FIG. 7. Alternatively, it may be some discrete address spaces in the source memory, as shown in the segmentation area 1 in FIG. 7. After obtaining the source memory address space of the segmentation area corresponding to each display screen, the contents of the address space need to be copied to the target memory in the order of the pixels of the display screen, so that the contents of the target memory and the stage display screen are kept to be spatially consistent. Finally, the contents of the target memory are output to the display controller.

Under ideal conditions, at each display time point, the source image is converted and output to the display screen in real time, so that the dynamic video background can be seen on the display screen of the dynamic stage. However, in actual situations, because the dynamic stage of a large-scale performance involves hundreds of high-resolution display screens, the video files are huge, and it takes a long time to convert, copy, and output each frame of source image. Therefore, if the video frame image is converted and output at each specific moment of display, the frame rate required for video output cannot be reached, that is, the effect of real-time video background display cannot be achieved.

According to a specific implementation of an embodiment of the present disclosure, at each display time point, in step S43, the content of the target memory is added to the stage screen control video file. When to display, the stage screen control video file containing all time points is output to the display controller. That is to complete the conversion and storage of the source video before the performance. when performing, the processed stage screen control video file is directly output to the display controller, so that the video background display effect of the dynamic stage of the large-scale performance can be realized.

When converting the source video file to the stage screen control video file, the most important thing is to keep the time and space relationship between the stage screen control video file and the screen display consistent: time consistency means that each stage screen control video file is composed of the display content at different display time points arranged in order, and the space consistency means that each stage screen control video file corresponds to the specific display screen in the stage space, and only contains the display content in the corresponding display screen. The stage screen control video file is completely different from the source video. If the stage screen control video file is played directly on an ordinary computer, it will be trivial and messy and difficult to understand, but if it is output to the display controller of the dynamic stage, the output of the display screen can be correctly controlled, and the combination of multiple display screens can display the correct video background.

According to a specific implementation of an embodiment of the present disclosure, the method further comprise a step of performing image editing on the segmentation area.

As shown in FIG. 7, during the display process of the display screen, it is often needed to transform the content of the source memory, that is, the output content of the display screen is not a simple copy of the source image. At this time, the content of the segmentation area of the source memory needs to be transformed accordingly by a processor, such as image editing such as rotation, toning, and zooming. For example, if the segmentation area corresponding to the source image is inconsistent with the resolution of the display screen, the segmentation area copied to the target memory space needs to be zoomed so that the zoomed segmentation area is consistent with the resolution of the display screen.

According to a specific implementation of an embodiment of the present disclosure, all the display screens are grouped according to their positions, and the display controllers of each group of display screens are combined; in the step I, target memory space is allocated for each group of display screens, in step S4, image segmentation and memory copy operations in units of display screen groupings are cyclically executed, the corresponding segmentation area of each display screen in the group is copied to the target memory space in an arrangement order of the display screens.

One of the difficulties faced by large-scale performance dynamic stages is the management of a large number of display controllers of display screens. The simplest case is to set up a display controller for each display screen, but this requires separate management programs and processes for each display screen. For example, allocate target memory space for each display screen to copy the display controller, and then proceed to the management process of the next display screen. In this way, the target memory space corresponding to the display screen can be recycled after it is used up. The occupied space of the target memory is small, but the system hardware and wiring are complicated, and frequent switching in each display screen control process is required, resulting in low efficiency. Another way is shown in FIG. 6 and FIG. 7, by setting up a display controller for all the display screens, the system hardware structure and management procedures are very simple. However, due to the huge number of display screens involved in large-scale performances, it is needed to allocate too large target memory spaces; In addition, when copying the target memory to the display controller, it takes a long time to copy each time due to too much space, which cannot meet the real-time display requirements of large-scale performances.

In order to solve the problem of managing a large number of display controllers of the display screens, according to a specific implementation of an embodiment of the present disclosure, a method of grouping the display screens is adopted. In order to facilitate the hardware and wiring, the principle of grouping is based on the positions of the display screens. Although the display screen changes dynamically during the performance, generally speaking it will move in a local range. The display screens in close positions are grouped, and the display screens in the same group share one display controller, which will bring convenience and conciseness for wiring and simplify the hardware management of the display controller. After the display screens are grouped, each group is used as the basic unit for allocating target memory space and for copying the display controller, which will bring a balance of time and space efficiency. When the target memory space is allocated, according to specific hardware resources, for example, the target memory space of 5 display screen groups can be allocated at the same time. When a certain group is processed, the occupied memory is released, and other groups obtain memory resources for corresponding data processing. When the memory is allocated according to the grouping of display screens, it is needed to copy the corresponding segmentation area of each display in the group to the target memory space according to the arrangement order of the display screens, and finally the storage content in the target memory space is output to the display controller of the group of display screens.

According to a specific implementation of an embodiment of the present disclosure, for a multi-layered stage with occlusion relationship, an occluded group of display screens does not perform a target memory copy operation; in a process of outputting the target memory to the display controller, directly reuse the content of the target memory of the unoccluded group of display screens with positions at the forefront.

As shown in FIG. 4, for the three-dimensional dynamic stage of a large-scale performance, the stage module is divided into many layers, which often have an occlusion relationship. For the audience, only the forefront display screen can be seen, and the rear-row display screen is actually invisible to the audience because it is occluded. However, if the occluded display screen does not contain any display signals, it will become a black screen, which may be displayed during the movement of the display screen, which will greatly affect the stage background effect. A better way to deal with it is to reuse the display information of the front display screen on the rear-row display screen, so that the best stage background effect can be obtained. In the display process of the display screen, the consumption of space and time resources is mainly reflected in allocating target memory for the display screen, and determining the display content of the display screen according to the segmentation area and writing the display content into the target memory.

According to a specific implementation of an embodiment of the present disclosure, when the rear-row display screen reuse the display information of the front display screen, the target memory copy operation is not performed; in a process of outputting the target memory to the display controller, the content of the target memory of the unoccluded group of display screens with positions at the forefront is directly reused. In this way, while setting appropriate display information for the rear-row display screen, the time and space resources of the system are greatly saved.

According to a specific implementation of an embodiment of the present disclosure, an output sequence of the groups of display screens is arranged so that the multi-layered stage with occlusion relationship is output in an order from front to back, and a shared target memory space for a corresponding group of display screens is allocated; in the step S3, firstly determine whether the group of display screens is occluded, and directly reuse an existing content of the shared target memory space for the occluded group of display screens.

For display screens that have an occlusion relationship, the rear-row display screen can reuse the display information of the front display screen. In this case, the display efficiency can be improved. Therefore, in order to improve the overall display efficiency of the dynamic stage, according to a specific implementation of an embodiment of the present disclosure, an output sequence of the groups of display screens is arranged so that the multi-layered stage with occlusion relationship is output in an order from front to back, and a shared target memory space for a corresponding group of display screens is allocated. In step S3, firstly determine whether the group of display screens is occluded, and directly reuse an existing content of the shared target memory space for the occluded group of display screens. Before the display screen outputs, the output sequence of the groups of display screens is arranged in advance, so that all the occluded group of display screens can reuse the front-row display information. Due to the large number of occlusions in the dynamic stage of large-scale performances, the digital display efficiency of the stage can be greatly improved.

Various preferred implementations of the display extraction output unit in Embodiment 1 can be used in this embodiment, and will not be repeated here.

In another aspect, the present disclosure also provides an electronic device, which comprises:

at least one processor; and a memory communicatively connected to the at least one processor; wherein the memory stores instructions executable by the at least one processor, and the instructions are executed by the at least one processor to enable the at least one processor to execute the above-mentioned method for editing and displaying dynamic stage video of a large-scale performance based on time-space consistency.

On the other hand, the present disclosure also provides a non-transitory computer-readable storage medium, the non-transitory computer-readable storage medium stores computer instructions, and the computer instructions are configured to enable a computer execute the above-mentioned method for editing and displaying dynamic stage video of a large-scale performance based on time-space consistency.

It should be noted that the above-mentioned embodiments and the specific implementations of each embodiment can be used in combination, and this disclosure will not repeat all possible combinations one by one.

The flowcharts and block diagrams in the accompanying drawings illustrate the possible implementation architecture, functions, and operations of the system, method, and computer program product according to various embodiments of the present disclosure. In this regard, each block in the flowchart or block diagram may represent part of a module, program segment, or code, and the part of the module, program segment, or code includes one or more executable instruction for realizing the specified logic function.

It should also be noted that, in some alternative implementations, the functions marked in the block may also occur in a different order from the order marked in the drawings. For example, two blocks shown in succession can actually be executed substantially in parallel, and they can also sometimes be executed in the reverse order, depending on the functions involved.

It should also be noted that each block in the block diagram and/or flowchart, and the combination of the blocks in the block diagram and/or flowchart, can be implemented by a dedicated hardware-based system that performs the specified functions or operations or can be implemented by a combination of dedicated hardware and computer instructions.

The units involved in the embodiments described in the present disclosure may be implemented in a software manner, and may also be implemented in a hardware manner. The name of the unit does not constitute a limitation on the unit itself.

It should be understood that each part of the present disclosure can be implemented by hardware, software, firmware, or a combination thereof.

The above are only specific embodiments of the present disclosure, but the protection scope of the present disclosure is not limited thereto. Any changes or substitutions within the technical scope disclosed in the present disclosure that can be easily conceived by skilled person familiar with the art all should be covered within the protection scope of this disclosure. Therefore, the protection scope of the present disclosure should be subject to the protection scope of the claims.

What is claimed is:

1. A virtual stage based on parallel simulation, comprising a stage modeling unit, a motion simulation unit, a display simulation unit, a data extraction output unit, and a display monitoring unit, wherein
the stage modeling unit is configured to perform stage simulation modeling;
the motion simulation unit is configured to simulate a stage motion in a simulation system;
the display simulation unit is configured to simulate LED screen display of the stage in the simulation system;
the data extraction output unit comprising a styling extraction output unit, a motion extraction output unit and a display extraction output unit, is configured to extract data from the virtual stage for processing and conversion, and output geometric styling parameters of an actual stage, stage mechanical motion parameters, and stage LED screen display parameters;
the display monitoring unit is configured to set up a capture card on the actual stage, collect LED video images and return them to the virtual stage for analysis and comparison;
wherein, the display extraction output unit comprises a module that maps a stage image background to display data of each display screen in the stage, and a specific mapping method comprises the following steps:
obtaining a spatial position, orientation and size of each display screen;
determining a display source image corresponding to each display screen, expanding the display screen on a plane of the display source image, and obtaining a corresponding segmentation area of each display screen in the source image according to a corresponding relationship between an expanded geometric shape of the display screen and the source image set by a user;
performing the following operations in cycles for each display screen:
segmenting the corresponding segmentation area of the display screen from the source image;
outputting a content of the corresponding segmentation area to a display controller of the display screen;
outputting an image content of the display controller to the display screen;
wherein, the display extraction output unit further comprises a module that maps a stage video background to the display data of each display screen in the stage, and a specific mapping method is: decomposing a video into a sequence of frame images, obtaining a corresponding source image at each display time point and performing the following steps:
obtaining a spatial position, orientation and size of each display screen;
determining a display source image corresponding to each display screen, expanding the display screen on a plane of the display source image, and obtaining a corresponding segmentation area of each display screen in the source image according to a corresponding relationship between an expanded geometric shape of the display screen and the source image set by a user;
performing the following operations in cycles for each display screen:
segmenting the corresponding segmentation area of the display screen from the source image;
adding a content of the corresponding segmentation area to a stage screen control video file corresponding to the display screen;
when to display, the display controller reading the stage screen control video file containing all time points and outputting it to the display screen.

2. The virtual stage based on parallel simulation according to claim 1, wherein, before the step of performing the following operations in cycles for each display screen, the source image is read into a source memory; during the step of performing the following operations in cycles for each display screen, a method of segmenting the corresponding segmentation area of the display screen from the source image is as follows: allocating target memory space for the display screen, obtaining source memory address space corresponding to the segmentation area according to an offset of each pixel in the corresponding segmentation area of the display screen in the source image relative to an image origin, and copying a content of the address space to the target memory in an order of pixels of the display screen.

3. The virtual stage based on parallel simulation according to claim 2, further comprising a step of performing image editing on the segmentation area.

4. The virtual stage based on parallel simulation according to claim 3, wherein all the display screens are grouped according to their positions, and the display controllers of each group of display screens are combined; during the step of performing the following operations in cycles for each display screen, allocates the target memory space for each group of display screens, copy the corresponding segmentation area of each display screen in the group to the target memory space in an arrangement order of the display screens, and finally output a stored content in the target memory space to the display controller of the group of display screens.

5. The virtual stage based on parallel simulation according to claim 4, wherein, for a multi-layered stage with occlusion relationship, an occluded group of display screens does not perform a target memory copy operation; in a process of outputting the target memory to the display controller, directly reuse the content of the target memory of the unoccluded group of display screens with positions at the forefront.

6. The virtual stage based on parallel simulation according to claim 5, wherein, an output sequence of the groups of display screens is arranged so that the multi-layered stage with occlusion relationship is output in an order from front to back, and a shared target memory space for a corresponding group of display screens is allocated; during the step of performing the following operations in cycles for each display screen, firstly determine whether the group of display screens is occluded, and directly reuse an existing content of the shared target memory space for the occluded group of display screens.

7. The virtual stage based on parallel simulation according to claim 6, further comprising a motion monitoring unit configured to measure motion state data of the actual stage and perform analysis and comparison.

8. The virtual stage based on parallel simulation according to claim 1, characterized in that, it further comprises a stage configuration file and a universal stage module unit, wherein:
the stage configuration file is configured to write specific stage related parameters;
the universal stage module unit is configured to establish a universal stage module in the simulation system and encapsulate 3D drawing function of the universal stage module;
the stage modeling unit is configured to model stage styling by using the universal stage module according to the stage configuration file;
the motion simulation unit is configured to simulate a motion of the universal stage module in the simulation system according to the stage configuration file;
the display simulation unit is configured to simulate LED screen display of the universal stage module in the simulation system according to the stage configuration file;
the data extraction output unit comprising a styling extraction output unit, a motion extraction output unit and a display extraction output unit, is configured to extract data of each universal stage module from the simulation system for processing and conversion, and output geometric styling parameters of each actual stage module, stage mechanical motion parameters, and stage LED screen display parameters;
the stage configuration file comprises a list of stage modules comprised in a specific stage, parameters of each stage module in the list comprising a size specification, a motion direction, a speed limit, and screen resolutions of six surfaces of up, down, left, right, front and rear; the stage configuration file further comprises background configuration parameters; the background configuration parameters comprising, for an image background, a path and resolution of a source image file, a corresponding source image file for each display screen, and a corresponding relationship between each source image and a stage space; and, for a video background, a path and resolution of a source video file and a stage screen control video file, a source video file and a stage screen control video file corresponding for each display screen, and a corresponding relationship between each source video and the stage space.

9. The virtual stage based on parallel simulation according to claim 8, characterized in that, the universal stage module unit is implemented in a componentized manner, and each universal stage module is initialized as a software component, and 3D rendering data of the module is encapsulated inside the component, which is responsible for realization of 3D scene drawing of this module, and the virtual stage realizes management of the stage modules by loading and unloading components and switching between components and informs a selected stage module to realize 3D scene drawing through message distribution.

10. The virtual stage based on parallel simulation according to claim 9, characterized in that, the stage configuration file further comprises an operation sequence of loading, unloading, and switching of stage modules, and the stage modeling unit performs automated stage modeling according to the operation sequence.

11. The virtual stage based on parallel simulation according to claim 1, further comprising a stage configuration file and a universal stage module unit, wherein:
the stage configuration file is configured to write specific stage related parameters;
the universal stage module unit is configured to establish a universal stage module in the simulation system and encapsulate 3D drawing function of the universal stage module;
the stage modeling unit is configured to model stage styling by using the universal stage module according to the stage configuration file;
the motion simulation unit is configured to simulate a motion of the universal stage module in the simulation system according to the stage configuration file;
the display simulation unit is configured to simulate LED screen display of the universal stage module in the simulation system according to the stage configuration file;
the data extraction output unit comprising a styling extraction output unit, a motion extraction output unit and a display extraction output unit, is configured to extract data of each universal stage module from the simulation system for processing and conversion, and output geometric styling parameters of each actual stage module, stage mechanical motion parameters, and stage LED screen display parameters;
the stage configuration file comprises a list of stage modules comprised in a specific stage, parameters of each stage module in the list comprising a size specification, a motion direction, a speed limit, and screen resolutions of six surfaces of up, down, left, right, front and rear; the stage configuration file further comprises background configuration parameters; the background configuration parameters comprising, for an image background, a path and resolution of a source image file, a corresponding source image file for each display screen, and a corresponding relationship between each source image and a stage space; and, for a video background, a path and resolution of a source video file and a stage screen control video file, a source video file and a stage screen control video file corresponding for each display screen, and a corresponding relationship between each source video and the stage space.

12. The virtual stage based on parallel simulation according to claim 11, wherein, before the step of performing the following operations in cycles for each display screen, the source image is read into a source memory; during the step of performing the following operations in cycles for each display screen, a method of segmenting the corresponding segmentation area of the display screen from the source image is as follows: allocating target memory space for the display screen, obtaining source memory address space corresponding to the segmentation area according to an offset of each pixel in the corresponding segmentation area of the display screen in the source image relative to an image origin, and copying a content of the address space to the target memory in an order of pixels of the display screen.

13. The virtual stage based on parallel simulation according to claim 12, wherein, the universal stage module unit is implemented in a componentized manner, and each universal stage module is initialized as a software component, and 3D rendering data of the module is encapsulated inside the component, which is responsible for realization of 3D scene drawing of this module, and the virtual stage realizes management of the stage modules by loading and unloading components and switching between components and informs a selected stage module to realize 3D scene drawing through message distribution.

14. The virtual stage based on parallel simulation according to claim 13, wherein, the stage configuration file further comprises an operation sequence of loading, unloading, and switching of stage modules, and the stage modeling unit performs automated stage modeling according to the operation sequence.

15. The virtual stage based on parallel simulation according to claim 14, further comprising a motion monitoring unit configured to measure motion state data of the actual stage and perform analysis and comparison.

* * * * *